(12) United States Patent
Fischmann

(10) Patent No.: US 11,978,131 B2
(45) Date of Patent: May 7, 2024

(54) PUBLICLY ACCESSIBLE URBAN BEACH ENTERTAINMENT COMPLEX WITH A CENTERPIECE MAN-MADE TROPICAL-STYLE LAGOON AND METHOD FOR PROVIDING EFFICIENT UTILIZATION OF LIMITED USE LAND

(71) Applicant: Crystal Lagoons Technologies, Inc., Coral Gables, FL (US)

(72) Inventor: Fernando Benjamin Fischmann, Miami, FL (US)

(73) Assignee: CRYSTAL LAGOONS TECHNOLOGIES, INC., Miami, FL (US)

( * ) Notice: Subject to any disclaimer, the term of this patent is extended or adjusted under 35 U.S.C. 154(b) by 118 days.

(21) Appl. No.: 17/871,806

(22) Filed: Jul. 22, 2022

(65) Prior Publication Data
US 2023/0057876 A1    Feb. 23, 2023

Related U.S. Application Data

(63) Continuation-in-part of application No. 17/672,313, filed on Feb. 15, 2022, now Pat. No. 11,669,929,
(Continued)

(51) Int. Cl.
*G06Q 99/00* (2006.01)
*C02F 1/00* (2023.01)
(Continued)

(52) U.S. Cl.
CPC .............. *G06Q 99/00* (2013.01); *C02F 1/004* (2013.01); *C02F 1/50* (2013.01); *E04B 1/342* (2013.01);
(Continued)

(58) Field of Classification Search
CPC . G06Q 99/00; C02F 1/004; C02F 1/50; C02F 2103/42; C02F 2201/007;
(Continued)

(56) References Cited

U.S. PATENT DOCUMENTS

2012/0291193 A1* 11/2012 Panchal ................ E04H 4/1209
                                                              210/97
2015/0166361 A1*  6/2015 Fischmann ........... C02F 1/5281
                                                              210/732

* cited by examiner

*Primary Examiner* — Christine J Skubinna
(74) *Attorney, Agent, or Firm* — MERCHANT & GOULD P.C.

(57) ABSTRACT

A publicly accessible urban beach entertainment complex is disclosed, with a man-made tropical, pristine-clear lagoon as the centerpiece of the complex, with surrounding entertainment, educational, sports, and commercial facilities, the complex having controlled public access and providing the look and feel of a tropical beach with clear waters and sandy beaches. In addition a method for efficiently utilizing facilities and land that are vacant, underutilized, have limited uses, or that are contiguous to or nearby recreational, educational, sports, or commercial venues is disclosed. The method providing a publicly accessible urban beach entertainment complex with a centerpiece man-made tropical-style pristine-clear lagoon. The method allows for generating revenue and increasing efficiency by pairing vacant sites, underutilized sites, limited use land, or sites that are contiguous to entertainment, educational, sports, and/or commercial venues with urban beach entertainment complexes. The complex preferably has a controlled public access, thereby allowing entrance upon payment of a fee.

94 Claims, 20 Drawing Sheets

Related U.S. Application Data which is a continuation of application No. 16/678,934, filed on Nov. 8, 2019, now Pat. No. 11,250,533, which is a continuation of application No. 16/588,785, filed on Sep. 30, 2019, now Pat. No. 10,997,684, which is a continuation of application No. 16/528,345, filed on Jul. 31, 2019, now Pat. No. 10,997,683, which is a continuation of application No. 15/990,141, filed on May 25, 2018, now Pat. No. 10,521,870.

(60) Provisional application No. 62/639,211, filed on Mar. 6, 2018, provisional application No. 62/625,182, filed on Feb. 1, 2018.

(51) Int. Cl.
| | | |
|---|---|---|
| *C02F 1/50* | (2023.01) | |
| *C02F 103/42* | (2006.01) | |
| *E04B 1/342* | (2006.01) | |
| *E04H 3/02* | (2006.01) | |
| *E04H 3/10* | (2006.01) | |
| *E04H 3/14* | (2006.01) | |
| *E04H 3/22* | (2006.01) | |
| *E04H 4/00* | (2006.01) | |
| *E04H 4/12* | (2006.01) | |
| *E04H 4/14* | (2006.01) | |
| *E04H 17/00* | (2006.01) | |
| *E06B 11/02* | (2006.01) | |
| *E06B 11/08* | (2006.01) | |

(52) U.S. Cl.
CPC ............... *E04H 3/10* (2013.01); *E04H 4/00* (2013.01); *E04H 4/0006* (2013.01); *E04H 4/12* (2013.01); *E04H 4/1218* (2013.01); *E04H 4/1281* (2013.01); *E04H 4/14* (2013.01); *E04H 4/144* (2013.01); *C02F 2103/42* (2013.01); *C02F 2201/007* (2013.01); *C02F 2303/04* (2013.01); *E04H 3/02* (2013.01); *E04H 3/14* (2013.01); *E04H 3/22* (2013.01); *E04H 17/00* (2013.01); *E06B 11/02* (2013.01); *E06B 11/08* (2013.01)

(58) Field of Classification Search
CPC ............ C02F 2303/04; C02F 2103/007; E04B 1/342; E04H 3/10; E04H 4/00; E04H 4/0006; E04H 4/12; E04H 4/1218; E04H 4/1281; E04H 4/14; E04H 4/144; E04H 3/02; E04H 3/14; E04H 3/22; E04H 17/00; E06B 11/02; E06B 11/08
See application file for complete search history.

20

20a — Defining a Site with a Minimum Total Surface of 1.6 hectares, and a Minimum Surrounding Population Within a 50-Mile Radius

20b — Developing an Urban Beach Entertainment Complex with a Tropical-Style Pristine Clear Lagoon as its Centerpiece with a Surface of at Least 10,000 m²

20c — Having at Least One Portion of the Centerpiece Lagoon Having a Zero-Entry Edge and a Sand Beach Area Surrounding the Lagoon

20d — Incorporating Entertainment and Commercial Amenities into the Urban Beach Entertainment Complex

20e — Implementing a Control Access System, Which Allows to Control the Entrance of Visitors to the Urban Beach Entertainment Complex

20f — Charging an Entry Fee Based on the Control Access System, Which Allows Access to at Least a Portion of the Urban Beach Entertainment Complex

20g — Having a Minimum of 100,000 Annual Visitors, Which Yields a Direct Return Based on the Amount of Sold Tickets

FIG. 10

FIG. 14A
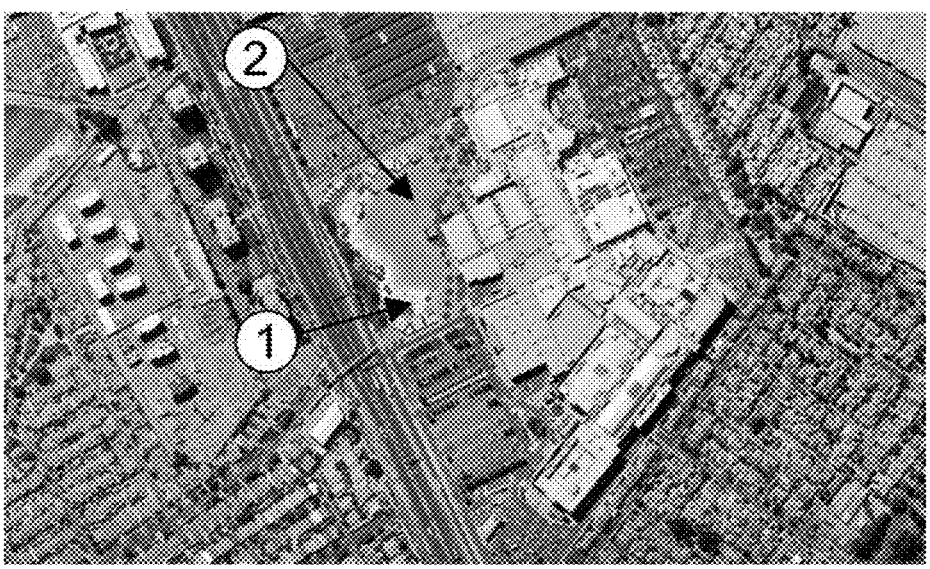
FIG. 14B

PUBLICLY ACCESSIBLE URBAN BEACH ENTERTAINMENT COMPLEX WITH A CENTERPIECE MAN-MADE TROPICAL-STYLE LAGOON AND METHOD FOR PROVIDING EFFICIENT UTILIZATION OF LIMITED USE LAND

This application is a continuation-in-part of U.S. patent application Ser. No. 17/672,313 filed Feb. 15, 2022, which is a continuation of U.S. patent application Ser. No. 16/678,934 filed Nov. 8, 2019 (now U.S. Pat. No. 11,250,533 issued Feb. 15, 2022), which is a continuation of U.S. patent application Ser. No. 16/588,785 filed Sep. 30, 2019 (now. U.S. Pat. No. 10,997,684 issued May 4, 2021), which is a continuation of U.S. patent application Ser. No. 16/528,345 filed Jul. 31, 2019 (now U.S. Pat. No. 10,997,683 issued May 4, 2021), which is a continuation of U.S. patent application Ser. No. 15/990,141 filed May 25, 2018 (now. U.S. Pat. No. 10,521,870 issued Dec. 31, 2019), which claims benefit of U.S. Provisional Ser. No. 62/639,211, filed Mar. 6, 2018, and U.S. Provisional Ser. No. 62/625,182, filed Feb. 1, 2018, which applications are incorporated herein by reference. To the extent appropriate, a claim of priority is made to each of the above disclosed applications.

FIELD OF THE INVENTION

The present invention relates to a man-made publicly accessible urban beach entertainment complex having a man-made tropical-style pristine-clear lagoon as the complex' centerpiece having at least one surrounding entertainment, educational, cultural, sports, or commercial facilities, the complex having controlled public access and providing the sensation and feeling of being at a tropical beach with clear waters and sandy beaches.

The present invention further relates to a method for efficiently utilizing facilities and land that are vacant, underutilized, with limited use and/or are contiguous or nearby recreational, educational, cultural, sports, or commercial venues by providing a publicly accessible urban beach entertainment complex with a centerpiece man-made tropical-style pristine-clear lagoon.

BACKGROUND

In the world, there are innumerable land sites, such as vacant land, that are underutilized due to different factors. There are also diverse recreational, educational, sports, and commercial venues that have contiguous large pieces of land that could benefit from its development. Such sites, with limited or no use, generally have to pay monthly or annual maintenance fees or taxes, with little or no direct income resulting from its use. For example, it is estimated that in the U.S., up to 25% of the total land area in cities is composed of vacant land (according to experts), and it is recommended that such spaces be managed more efficiently to meet the current and future requirements of urban residents. This urban vacant land includes land that can be used for future real estate development, among other uses. Additionally, there are sites that have no use, such as greenfields, brownfields, or agricultural or uncultivated land that can be found relatively near urban centers.

Examples of the diverse recreational, educational, sports, and commercial venues with contiguous sites noted above are event arenas, museums, amusement parks, water parks, stadiums, golf courses, membership clubs, zoos, aquariums, shopping centers, university campuses, casinos, cruise ship ports, speed tracks, horse race tracks, and Olympic venues, among others.

It has been estimated that there are more than 100,000 of these types of venues around the world based on the inventor's research, where a large portion of them have nearby or contiguous land that is currently underutilized or has limited use, representing a large worldwide market for the implementation of new and innovative concepts that efficiently utilize the aforementioned sites, and that drastically improve and change the lifestyle of people living in close proximity to these sites. Additionally, many of these venues have large associated infrastructure such as parking lots, access routes, and large spaces that are underutilized or with low utilization rates. For example, some stadiums are used only once or twice per week, where the rest of the time their existing infrastructure has no alternative or additional use. The same happens in the infield of horse and car race tracks, which often are not used or only used during racing events (i.e., and not for alternative or additional purposes). In addition, some race tracks have closed and so the structures are not being efficiently used.

It is also important to note that there are currently several significant trends occurring around the world in connection with retail shopping. More specifically, shopping malls and stores are closing their doors at unprecedented rates. This makes available large empty spaces that can be reinvented and used for other purposes. It is estimated that one quarter of all shopping malls in the U.S. are expected to shutter in the next five years (according to predictions by Credit Suisse). In many cases, such spaces are no longer offering what the public is looking for, like recreational and cultural activities, a gathering place to spend time with family and friends, additional amenities, and a setting to relax and improve physical and mental health.

Another significant recent trend is that golf courses have gone from explosive growth to high closure rates. More than 800 golf courses have closed in the U.S. over the last decade, according to Bloomberg. The reason often proffered is that golf is not a family friendly sport, causing a declining interest from people who are looking for new activities and experiences to share with their families and friends. Golf course closures leave operators with large pieces of land that may be abandoned. This creates a large problem where vacant sites may end up transforming into derelict sites. Again, closures reflect people's changing preferences for entertainment and leisure, aiming for outdoor recreational and cultural activities, and treasuring family and friend's time, looking for a new and dream-like meeting point.

Therefore, the increasing availability of vacant, limited use land, underutilized land or land that is contiguous or nearby recreational, educational, sports, or commercial venues is an untapped market that has had no innovations over the last years and that could be paired with a newly created complex that appeals to people living around the complex and which leads to more efficient uses.

In addition to the availability of underutilized spaces, urban life and necessities have also evolved over the years. Publicly accessible open recreational spaces have decreased due to urbanization and population growth. It is often expressed that living in large cities has become more and more stressful. With more than 50% of people in the world living in urban areas as mentioned by the United Nations, there is an increasing and very important need to provide attractive and versatile recreational spaces, especially outdoors, that can help people get out of their stressful routines and relax in a peaceful, paradisiacal environment. According to these trends, the era of gathering in closed spaces such as malls, movie theaters, and confined gyms is waning, with a desire for open and paradisiacal spaces to improve the lifestyle of people around the world.

Paradisiacal and tropical beaches have been found to be one of the preferred destinations for people all over the world. The desire to relax and enjoy outdoor experiences is universal, especially during summer and warmer months. Tropical settings and beaches are one of the most preferred spots among international travelers. Additionally, beaches are very popular for domestic travelers, motivated to get away from normal, everyday life and to relax and rejuvenate in a tropical paradise. People in general seek to visit and be part of recreational destinations, especially close to the sea and beach areas. For example, in the U.S., the shoreline constitutes less than 10% of the total land area (not including Alaska), but accounts for 39% of the total population, according to the National Ocean Service. However, many of the beaches found in the shoreline are not suitable for swimming, are very windy have dark sand, and present safety concerns in terms of currents, surf, marine life, rocks, and/or other associated risks. This creates a situation where many people do not swim or practice water sports in or around such beaches.

Instead, people dream of white sandy beaches with tropical turquoise-colored waters. Their dreams include being immersed in a beach setting, with the look and feel of tropical environments, enjoying an idyllic lifestyle next to pristine-clear waters with natural wave movement. Also, in these types of settings, in addition to swimming, practicing water sports is a popular activity demanded by people. Such water sports cannot be practiced in backyard or community pools.

Conventional swimming pools simply do not allow for the incorporation of these idyllic beach amenities. For the purposes of the present invention, and based on its worldwide definition, a conventional swimming pool is defined as an impervious water body built out of concrete or similar materials, and that for its operation requires to filter the complete water volume contained in the pool 4 times per day, and also requires maintaining a permanent residual chlorine level of at least 1.0 ppm in the complete water volume according to regulations in Florida such as Rule 64E-9 from the Florida Department of Health).

Even though a public pool provides a swimmable body of water, it does not resolve the key parameters required to generate a beach lifestyle look and feel, an urban beach entertainment complex, and the sensation of being in a tropical setting. Several of the reasons include: (i) very high construction and operation costs, comprising electricity and chemical requirements, which limit their sizes—therefore only small pools are built; (ii) general use of right angles, straight lines and artificial looking shapes; (iii) they do not generally have beach areas with sand; (iv) the color of the water appears artificial and unnatural due to their small dimensions and low depths; (v) they do not have a natural wave motion since their sizes do not allow fetch length to create larger and more natural waves; (vi) they do not enable the practice of water sports due to their low depths and small sizes; (vii) they have a strong chlorine or chemical smell; (viii) and generally they are not surrounded by a tropical or beach-life scenery with docks. In more detail:

(i) Conventional swimming pools are very expensive to build and maintain, and they are generally built out of thick concrete structures with an artificial look.

For example, the "Fleishhacker Pool" located in California, with a surface of 15,000 m$^2$, had to be closed in 1971 due to water quality problems and high costs. There are several additional examples of this happening around the world.

Based on real swimming pool construction costs, an Olympic sized pool of around 1,000 m$^2$ costs about $1.8 million USD in direct construction costs and uses more than 23,000 kWh of monthly electricity and more than 25 gallons per day of chlorine, equivalent to more than $6,000 in direct monthly operation costs. Escalating the size and volume of such conventional pools renders extremely high costs of construction, especially due to the use of a thick concrete bottom with waterproof paint and large and expensive equipment to maintain water quality. Therefore, since escalating the size of conventional swimming pools is economically and technically difficult, they do not achieve large enough dimensions to resemble tropical seas and/or to practice water sports.

Operating costs of large pools are high and become economically prohibitive, due to an intensive electricity consumption to filter the complete water volume 4 times per day, and due to the use of chlorine to maintain a high and permanent chlorine level. Therefore, pools have a very high carbon footprint, which impacts the sustainability of such structures.

(ii) Public swimming pools are usually built with straight lines, straight angles and rectangular shaped geometries, which divert from natural and curved-shaped water bodies that resemble tropical seas or shores.

(iii) Pools do not usually include sandy beach areas, generating a more artificial look. Conventional pools are usually built out of thick concrete and coated with paintings or tiles, which generate the look of an artificial structure used to contain water, but not the look of an idyllic beach with white sandy beaches that resemble that of the tropics.

(iv) The color and tonality of the water achieved by swimming pools is usually artificial-looking due to their depths. Since pools usually have depths of up to 1.5 m, the reflection of the sun from the bottom of the pools do not generate an intense and deep turquoise color, such as the pristine turquoise color found in tropical seas. Also, since pools are small in size, they convey the sensation of being immersed in an artificial rather than a beach-like setting.

(v) Due to their small sizes, the wave action generated in pools looks artificial with poor surface water movement. The small sizes, and specifically the short lengths of pools (longest distance from one point on the perimeter of the pool to another point located in the perimeter of the pool) create a situation where the wind does not influence the surface of a small pool noticeably. The influence of the wind over a large distance above the water is called "fetch length", which influences the surface wave movement of the water. Small pools with small surfaces do not allow fetch length to occur and therefore do not generate larger, more natural-looking waves and wave action.

(vi) Conventional pools also do not usually provide the conditions to practice water sports, as many water sports require large surface areas and greater depths, which cannot be attained by conventional swimming pool construction and operation technologies since it is technically and economically unviable to build and maintain at a large scale. Water sports not usually practiced in small pools comprise sailing, rowing, windsurf, water skiing, cable skiing, use of flow-riders, stand up paddling, jet skiing, and kitesurfing, among others. For example, stand up paddle boarding, which is among the fastest growing watersport in the U.S., cannot be practiced in small pools since the desired sensation of paddling in a vast space is not achieved.

(vii) Many pools have strong chlorine or chemical smell, since their operation technologies and worldwide regulations require them to maintain a permanent and high residual chlorine level in the water in order to provide proper disinfection. Therefore, the chemical smell inhibits the illusion of being in a tropical paradise, and instead conveys the feeling of being in an artificial setting. Usually, pools need to maintain a minimum residual chlorine level of 1 ppm, which generates a highly noticeable chlorine smell.

(viii) Pools are generally not surrounded by tropical or beach-like scenery such as palm trees, and do not normally have docks or pontoons, as water sports are not practiced in such small pools. Therefore, the look and feel associated with idyllic beach life and a tropical paradise, which includes the practice of several water sports, is not created.

Based on the above, since life in cities has become more stressful and going to a Caribbean or other tropical beach is out of reach for most people (e.g., due to time, money, distance, or other constraints), the present invention overcomes, in a new and innovative manner, the aforementioned urban problem of lack of recreational spaces, by bringing beautiful tropical settings with pristine-clear waters and white sandy beaches to underutilized urban land or sites through a man-made urban beach entertainment complex with a centerpiece pristine-clear lagoon. Such entertainment areas are designed to change the lifestyle of people around the world by providing an idyllic beach-life setting that promotes relaxation and the enjoyment of pristine waters, by which conscious or subconscious stress can be reduced and mental and physical health can be improved. Different activities can be held around the centerpiece lagoon—including recreational, social, cultural, and sport activities which aim to transform the location into a beautiful, desirable landscape.

SUMMARY OF THE INVENTION

The present invention discloses a man-made publicly accessible urban beach entertainment complex with a man-made tropical, pristine-clear lagoon as the complex' centerpiece with surrounding entertainment, educational, sports, and/or commercial facilities, the complex having controlled public access and providing the look and feel of a tropical beach with clear waters and sandy beaches.

The present invention further relates to a method for efficiently utilizing facilities and land that are vacant, underutilized, have limited uses, or that are contiguous to or nearby recreational, educational, sports, or commercial venues by providing a publicly accessible urban beach entertainment complex with a centerpiece man-made tropical-style pristine-clear lagoon. The method allows for generating revenue and increasing efficiency by pairing vacant sites, underutilized sites, limited use land, or sites that are contiguous to entertainment, educational, sports, and/or commercial venues with urban beach entertainment complexes. The complex preferably has a controlled public access, thereby allowing entrance upon payment of a fee.

Therefore, according to one aspect of the invention, there is provided a publicly accessible urban beach entertainment complex, the complex comprising: a large centerpiece lagoon, the lagoon having a bottom, a perimeter, and a minimum surface area of 10,000 $m^2$ to recreate a tropical lifestyle look and feel, and wherein a majority of the bottom is constructed with a flexible, plastic material, the lagoon not presenting a noticeable chemical smell in its majority as in conventional pools that maintain a permanent residual chlorine level of 1 ppm, and wherein the lagoon further includes: at least one bathing zone within the lagoon, the bathing zone having a zero-entry edge at the perimeter, wherein the bathing zone comprises a localized disinfection system, whereby an increased chemical concentration is provided in the bathing zone; at least one water sports zone located within the lagoon, the water sports zone comprising a water depth of at least 1.8 meters at its deepest point; at least one sand beach area and a rest area surrounding the perimeter of the lagoon, wherein the sand of the sand beach area has a light color thereby resembling a tropical beach, and wherein the sand beach areas and rest areas have a surface area of at least 2,500 $m^2$; a water supply system, operatively connected to a water supply, for providing both filling and make-up water for the lagoon; a water treatment system arranged and configured to utilize at least 50% less electricity compared to a conventional swimming pool centralized filtration system, wherein the filtration capacity and filtration water volume is at least 50% lower than for a conventional swimming pool filtration system that filters the complete water volume 4 times per day; a physical barrier surrounding at least a portion of the urban beach entertainment complex, the barrier being arranged and configured to limit individual access to the complex or its centerpiece lagoon; an access control system located in at least one portion of the physical barrier, wherein the access control system is arranged and configured to selectively permit entry of individuals into at least a portion of the urban beach entertainment complex; and at least one ancillary facility located within the complex, selected from the group of commercial, recreational, educational, cultural, residential, and sports facilities in order to allow different events and activities to be held within the complex.

According to another aspect of the invention, there is provided a method for efficiently utilizing limited use land by creating a publicly accessible urban beach entertainment complex, the method comprising: selecting a site with a minimum total surface of 16,000 m2, wherein the site is selected from vacant land, underutilized sites, limited use land, or land that is contiguous or nearby recreational, educational, sports, or commercial venues, has a minimum surrounding population of 500,000 people within a 50-mile radius connected by road access, and has a water supply with sufficient availability for use at the site; constructing a centerpiece lagoon, the lagoon having a bottom, a perimeter, and a surface area between 10,000 $m^2$ and 200,000 $m^2$ to recreate a tropical lifestyle look and feel, wherein a majority of the bottom is constructed with a flexible, plastic material, and wherein at least one portion of the lagoon further includes a zero-entry edge resembling a natural beach edge: establishing at least one sand beach area and a rest area surrounding the perimeter of the lagoon, wherein the sand of the sand beach area has a light color thereby resembling a tropical beach, and wherein the sand beach areas and rest areas have a surface area of at least 2,500 $m^2$; connecting a water source to the lagoon with a water supply system, the water supply system providing both filling and/or make-up water for the lagoon; incorporate a water treatment system for treating water in the lagoon, wherein the water treatment system is arranged and configured to utilize at least 50% less electricity compared to a conventional swimming pool centralized filtration system, wherein the filtration capacity and filtration water volume is at least 50% lower than for a conventional swimming pool filtration system that filters the complete water volume 4 times per day; delimiting at least a portion of the lagoon, the sand beach area, and the rest area with a physical barrier, wherein the area within the physical barrier further creates an urban beach entertainment complex, the barrier being arranged and configured to limit individual access to the complex; locating an access control system in at least one portion of the physical barrier, wherein the access control system is arranged and configured to selectively permit entry of individuals into at least a portion of the urban beach entertainment complex; and establishing at least one ancillary facility located within the entertainment area, selected from the group of commercial, recreational, educational, cultural, residential, and sports facilities; whereby individual entry fees provide revenue for the urban beach entertainment complex, thereby providing an efficient use of a facility or land that has limited use.

Accordingly, embodiments constructed in accordance with the principles of the present invention provide people all over the world living near urban centers the possibility of getting away from their routine everyday lives and enjoying a beautiful beach-like tropical setting with a pristine-clear lagoon with white sandy beaches as its centerpiece. These publicly accessible urban beach entertainment complexes may become the meeting point of the 21$^{st}$ century, changing the lifestyle of people around the world.

These and various other features as well as advantages, which characterize the present invention, will be apparent from reading the following detailed description and a review of the associated drawings.

BRIEF DESCRIPTION OF THE DRAWINGS

Referring now to the drawings in which like reference numbers represent corresponding parts throughout:

FIG. 10 is a flow diagram describing a preferred method of practicing the present invention.

FIGS. 13A, 13B, 14A and 14B show a top plan schematic layout of an embodiment of the urban beach entertainment complex constructed within limited use sites, corresponding to parking lots, in the contiguous site to the shopping mall.

DETAILED DESCRIPTION

Figure 1A:
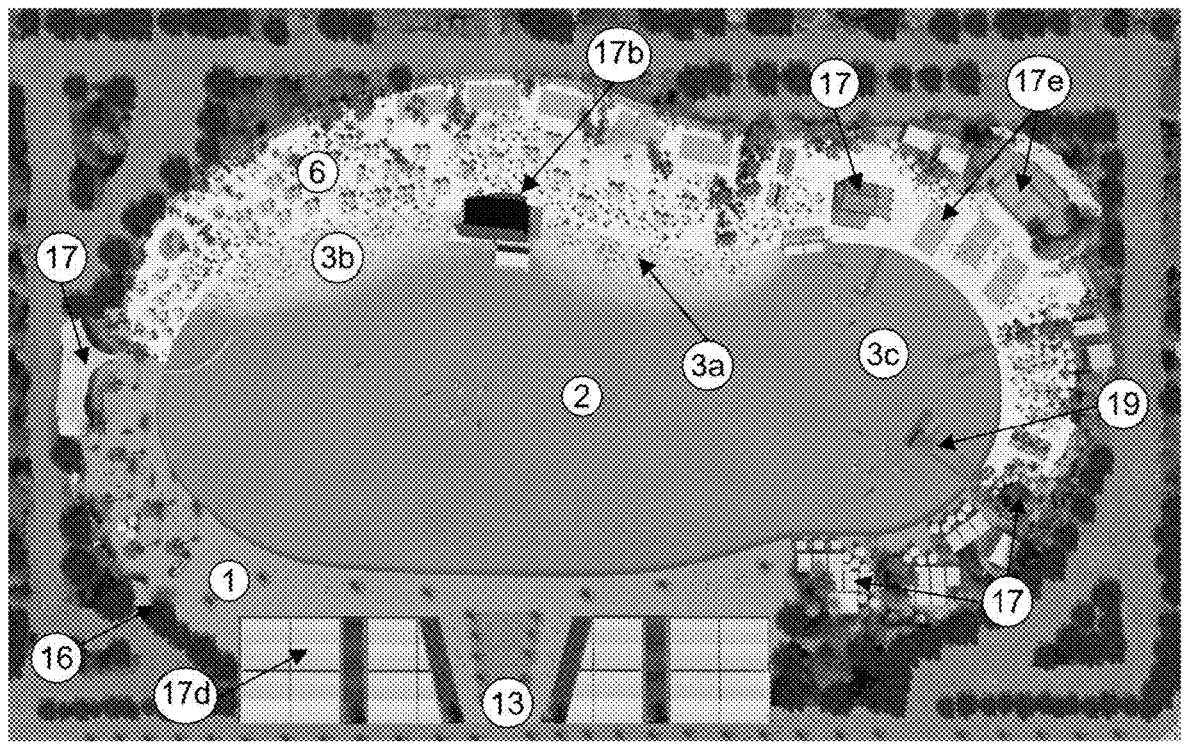
FIGS. 1A and 1B show an embodiment of the urban beach entertainment complex according to the present invention.

The present invention discloses a man-made publicly accessible urban beach entertainment complex with a man-made tropical-style lagoon as the complex' centerpiece with surrounding entertainment, educational, sports, and/or commercial facilities, the complex having controlled public access and providing the look and feel of a tropical beach with clear waters and sandy beaches.

The present invention further relates to a method for cost-efficiently utilizing facilities and land that are underutilized or are contiguous to or nearby recreational, educational, sports, or commercial venues by providing a publicly accessible urban beach entertainment complex with a centerpiece man-made tropical-style pristine-clear lagoon. The method allows for generating revenue and increasing efficiency by pairing vacant sites, limited use sites, underutilized sites or sites that are contiguous to entertainment, educational, sports, and/or commercial venues with the development of urban beach recreational complexes with a centerpiece man-made tropical-style pristine-clear lagoon, wherein the complex has controlled public access and therefore allows entrance of the public for a fee in at least one section of the complex. By transforming such sites into tropical paradises by creating urban beach entertainment complexes with a man-made tropical-style pristine-clear lagoon with white sandy beaches as its centerpiece, efficient use is made of the sites with revenue resulting from charging an entry fee to the complex and other revenues resulting from the complex' activities. It will be appreciated by those of skill in the art that the ultimate goal of the publicly accessible urban beach complex is a profitable use.

As referenced herein, a "tropical-style lagoon" is a large water body with crystal clear waters, with a water tonality and coloration ranging from turquoise to emerald, which is naturally generated in tropical settings (i.e., near the tropics) where depths range from 0.5 meters and up to 6 meters or higher. Such tropical-style lagoons have light-colored bottoms, generally from light colored sand, wherein their depth difference creates different tonalities within the same water bodies, with clearer waters at shallower depths and more intense-colored waters at deeper depths. These tropical-style lagoons constitute the typical scenery of the Caribbean as internationally recognized and as known to the average public.

Also, as used herein, the term "urban" refers to a type of setting and location that has road connections and access, and that is surrounded with a population of at least 200,000 people within a 30-mile radius.

Additionally, as used herein, a conventionally designed and operated swimming pool refers to a swimming pool designed and operated as per Florida's Public Swimming Pool Regulations, which are the regulations promulgated for public swimming pools in the state of Florida, United States of America, with effective date of Jul. 20, 2016, and that are found in Chapter 64E-9 of the Florida Administrative Code.

One advantage of the present invention is creating a piece of tropical paradise in cities in a cost-efficient way, by providing a publicly accessible urban beach entertainment complex with a centerpiece large tropical-style pristine-clear man-made lagoon that allows generating recreational, cultural, sports, educational, and commercial activities around the lagoon; and therefore provide a desirable meeting point in the $21^{st}$ century.

A further advantage of the invention is providing a method for efficiently utilizing sites such as vacant land, sites that are currently underutilized, or that are contiguous or nearby educational, sports, recreational, or commercial venues. The method of the present invention transforms such sites into tropical paradises by creating urban beach entertainment complexes with a man-made tropical-style pristine-clear lagoon and white sandy beaches as its centerpiece, wherein efficient use is made of the sites with a potential profit resulting from charging an entry fee to the complex (as well as revenues from the complex' other activities).

These cost-efficient publicly accessible urban beach entertainment complexes represent a completely new concept that allow people to visit a vacation-like space anywhere in the world, even just a few blocks away from home, providing a solution for the growing demand for new recreational spaces and beach-like retreats in sites that were not used for this purpose before. Complexes constructed in accordance with the principles of the present invention transform sites into a recreational family destination, and upgrade any venue into the next generation of entertainment. For example, if one were to ask 50 years ago where did people went to work out, people responded that they went to the park, or that they went for a run in the street, and when asked today people respond that they go to the gym. In the same way, when people want to go to the beach, they generally have to travel long distances by car or by plane, and have to spend a significant time for transportation. However, the present invention creates a beach that is located close to their homes and therefore it will represent a major change in people's lifestyle.

These publicly accessible urban beach entertainment complexes and their centerpiece large pristine-clear lagoons with a tropical look and feel provide an incomparable aesthetical landscape, with turquoise colored waters of vast dimensions that produce a relaxing and idyllic sensation. Therefore, these settings create an extremely attractive and spectacular location, where the surroundings can be used for activities that today are held in considerably less attractive places and with considerably inferior overall conditions. Therefore, these urban beach recreation complexes, and their centerpiece large pristine-clear lagoons with a tropical look and feel should become the meeting point of the $21^{st}$ century.

I. Difference with Existing Locations/Activities

As previously noted, the era in which confined places, such as malls and movie theaters are used as gathering and meeting points is declining. By creating and operating an urban beach recreation complex with a tropical ambiance including a pristine-clear lagoon surrounded by sandy beaches, an incomparable setting for a 21st century meeting place is created. Accordingly, the urban beach recreational complexes may replace conventional promenades, and public parks with an urban beach setting where different cultural, recreational, educational, and commercial activities will take place.

With respect to shopping malls, as previously mentioned, customer tendencies have changed, with consumers spending more on experiences such as travel, entertainment and food. This, along with the increasing trend of online shopping, has led to the closure of many stores and malls around the world. By having these publicly accessible urban beach entertainment complexes with a man-made pristine-clear lagoon with a tropical look and feel as its centerpiece, and incorporating shopping centers in its surroundings, this solution can help preserve the mall business by providing more than simply a point-of-sale to customers (e.g., by providing anew and transformational shopping experience). The customers will be able to enjoy a full day at the mall, either shopping, eating, lounging or relaxing in common areas (the term "hanging out" is often used to describe these sorts of activities in connection with a mall). The customers will, at the same time, be able to use all additional amenities and enjoy a beach day with tropical surroundings. This is unprecedented and it is anticipated to have a considerable impact on this market, where successful shopping center designs would incorporate these urban beach recreation complexes, which comprise entertainment, dining, and leisure components. Shopping centers need to provide unique and memorable experiences that will keep customers coming back frequently. Therefore, malls that are looking to renew their offerings and become part of the $21^{st}$ century meeting point, will find it desirable to build and incorporate publicly accessible urban beach complexes in accordance with the principles of this invention.

Additionally, activities such as jogging and walking have been held in closed spaces or in public parks with vegetation, but there is no worldwide reference to publicly accessible urban beach settings that provide the opportunity to appreciate a beautiful tropical-style crystalline lagoon similar to tropical seas.

Still further, there is a growing demand for outdoor weddings in idyllic settings and a movement away from closed and confined wedding venues. One popular alternative is a tropical beach wedding. Accordingly, a publicly accessible urban beach developed according to the principles of the present invention may provide a popular location for wedding ceremonies and celebrations.

Other activities and events that have been normally held in less attractive locations are concerts, which are held either in closed stadiums and arenas, or in open vacant sites that are conditioned only for such events, and generally do not have beautiful landscapes or surroundings.

A complex constructed in accordance with the present invention will create a beautiful setting and include a large number of activities surrounding the centerpiece tropical-style lagoon and that will revolve around it. The features of the complex may include nighttime illumination, bars and restaurants to meet with friends and family, screens, stages, and amphitheaters to house different recreational, cultural, educational, or sport activities—all leading to an environment in which it is possible to have a wonderful experience and to improve people's lifestyle.

II. Difference with Pools and Water Parks

It is important to note that these publicly accessible urban beach entertainment complexes will be very different from conventional water parks. Current water parks have a completely different concept as their main objective is providing slides, rides and water features for visitors. Such water parks do not provide a tropical environment with a beach-like look and feel, but rather provide visitors a set of rides and experiences within the park. On the other hand, the publicly accessible urban beach entertainment complexes of the present invention aim to provide a centerpiece contemplative man-made tropical, pristine-clear lagoon that enables different recreational, cultural, sports, educational, and commercial activities to be conducted in its surroundings. These activities simply would not otherwise exist without the centerpiece lagoon. Therefore, instead of having a water park with several small-sized pools and rides operating under conventional swimming pool technology, the urban beach entertainment complex provides a meeting point of the 21$^{st}$ century by enabling a series of recreational, cultural, sports, educational, and commercial activities to happen around the centerpiece lagoon with a beautiful and inviting setting.

In terms of the technologies used to build and operate the centerpiece tropical-style pristine-clear lagoon, it is important to understand that conventional swimming pools do not provide the conditions for these idyllic beach lifestyle amenities to exist. Even though a pool may provide a swimmable body of water, it does not resolve the key parameters required to generate a beach-like look and feel, an urban beach entertainment complex, and the sensation of being in a tropical setting.

Additionally, water park costs are much more expensive and considerably higher than for an urban beach recreation center as the ones from the present invention.

For example, a water park in South Dakota that includes three small water features of approximately 1,000 m$^2$, 600 m$^2$, and 700 m$^2$ (2,300 m$^2$ in total) using swimming pool technology has an estimated construction cost of around $5,000,000 (only considering the three water features and associated equipment), wherein an urban beach entertainment complex with a lagoon of 1.2 hectares (12,000 m$^2$) would have an estimated construction cost of about $1,800,000 (only considering the centerpiece lagoon and associated equipment).

Additionally, the operation cost of the referred water park is estimated as $20,000 per month considering electricity and chemicals, wherein the operation cost of the referred 1.2 hectare centerpiece lagoon would be estimated as $4,000 per month considering electricity and chemicals. This is based on a study conducted by the independent engineering firm Stantec, who designed and built such waterpark located in South Dakota.

Contrary to conventional public swimming pools, these publicly accessible urban beach entertainment complexes, with large man-made pristine-clear lagoons have a number of advantages as described in the following Table 1.

TABLE 1

| Description | Conventional Swimming Pool | Man-Made Large Pristine Clear Lagoon |
|---|---|---|
| Sizes | Small sizes, where usually the largest water parks have swimming pools with areas of 1,000 m$^2$-1,500 m$^2$ | At least about 3,000 m2, preferably at least about 8,000 m$^2$-about 10,000 m$^2$ of water surface |
| Construction costs | Prohibitive for large surfaces and volumes using current materials and techniques of swimming pools | Low cost, does not require a complete thick concrete bottom as conventional swimming pool construction standards |
| Electricity use | Very high due to intensive requirement of filtration of the complete water volume 4 times per day | At least 50% less than the electricity consumption from swimming pools |
| Chemical use | Very high due to intensive requirement of chemical use in pools to maintain a permanent and high chlorine level of 1 ppm in the complete water volume | At least 50% less than the chemical consumption from swimming pools |
| Shapes | Artificial looking due to use of right angles, straight lines, and rectangular shapes | Curved shapes, round geometries, natural looking |
| Use of beach areas with sand | Very unusual | Yes, in order to create a tropical-style look and feel |

TABLE 1-continued

| Description | Conventional Swimming Pool | Man-Made Large Pristine Clear Lagoon |
|---|---|---|
| Color of the water | Artificial looking color due to shallower depths | Natural looking color due to more intense tonalities caused by deeper depths |
| Wave motion | No natural wave motion generation due to small sizes and no fetch length to generate larger wave motion | Natural wave motion similar to the sea due to fetch length that enables the generation of natural looking waves |
| Practice of water sports | Not possible due to small sizes and low depths | Yes |
| Chemical smell | Yes, high due to the use of a permanent chemical residual chlorine levels | Not noticeable in most of the lagoon, significantly fewer chemicals are used, producing little to no chemical smell |
| Tropical setting | Not commonly surrounded by tropical settings (unless located in an actual tropical environment) | Yes, surrounded by a man-made tropical environment |
| Use of clocks and piers | Not applicable | Yes, to access deeper parts of the lagoon to practice watersports and/or contemplate its vastness |
| Look & feel | Small pools with high concrete use, similar to backyard pools | Large pristine-clear lagoons and white sandy beaches, resembling the Caribbean |

The aforementioned swimming pool construction and operation technologies have been always used in water parks. As noted above, water parks have different objectives, construction methods, operation technologies, and many other characteristics that separate them from the urban beach entertainment complex of the present invention. Several differences of the present technology compared to conventional water parks are described in the following Table 2.

TABLE 2

| Description | Conventional Water Park | Urban Beach Recreation Complex |
|---|---|---|
| Use | Temporal and sporadic use | Purpose of meeting point for frequent everyday use |
| Activities | Mostly short rides involving water | Cultural, sports, recreational, commercial, and educational activities will be found throughout the urban beach recreational complex |
| Additional Amenities and facilities | Basic food and shopping related to the water park | Shopping centers, restaurants, gyms, bars, event centers, and other facilities overlooking the centerpiece tropical-style lagoon, with the goal of becoming the meeting point of the $21^{st}$ century, where such amenities and facilities are arranged and configured to be directed toward the centerpiece lagoon |
| Cultural events | Not applicable | Yes, with concerts and other cultural activities within the urban beach recreation complex |
| Hours of Use | Daytime limited to warm weather | Daytime and nighttime use with different activities |
| Look & feel | Conventional pools with high concrete use, focused on children and offering short rides, with rollercoasters, water slides, and similar rides | Large centerpiece pristine-clear lagoon and white sandy beaches with the goal of becoming the meeting point of the $21^{st}$ century |
| Use of vertical structures | Large use of imposing vertical structures - e.g., such as water slides and similar features | Low use of vertical structures |

TABLE 2-continued

| Description | Conventional Water Park | Urban Beach Recreation Complex |
| --- | --- | --- |
| Use of watercraft | Not found or applicable | Yes, with the use of small and large watercraft for activities such as sailing, boating, canoeing, rowing, kayaking, among others |
| Practice of aquatic sports | Not found or applicable | Yes, such as the use of kiteboards, practicing water skiing (barefoot skiing, cable skiing, jet skiing), flyboarding, paddleboarding, parasailing, wakeboarding, windsurfing, kitesurfing, among others |
| Construction costs | Usually relatively shallow pools with thick concrete walls and bottom, with costs up to 10 times larger than that of the tropical-style lagoons of the present invention | Low cost, does not require a complete thick concrete bottom as required by conventional swimming pool construction standards |
| Water treatment technologies | Use of conventional swimming pool technology | Use of innovative technologies with lower electricity and chemical consumption than swimming pools |
| Overall setting | Similar to swimming pools | Natural look similar to a tropical setting |
| Shapes | Generally right angles, straight lines, rectangular shapes | Curved shapes, round geometries, natural looking |
| Use of beach areas with sand | Very unusual | Yes, in order to create a tropical-style look & feel with the beach areas and additional rest areas having a surface of at least 2,500 $m^2$ |
| Wave motion | No natural surface wave motion generation due to small sizes and no fetch length to generate larger wave motion | Allows natural wave motion similar to the sea due to fetch length that enables the generation of natural looking waves |
| Overall setting | Not commonly surrounded by tropical settings | Yes, surrounded by a tropical environment and the use of docks and piers |
| Recreational, social, cultural meeting point | Not applicable | Yes |

By creating these publicly accessible urban beach entertainment complexes and generating a beach lifestyle anywhere in the world in a cost-efficient, sustainable way, it may be possible to generate value and increase the overall appraisal of the contiguous or nearby sites. In addition, the creation of these complexes may thereby also increase the value of nearby buildings, houses, and any other facilities or amenities that are close to the complex. Appraisal may be even higher when there are commercial or residential buildings overlooking the urban beach recreational complex and its tropical-style pristine-clear lagoon directly, due to the beautiful scenery and the sensation of being on a beach-front property. The urban beach recreational center may also create and increase value in the entire zone where it is located, as it increases urban value due to the creation of beach-life close to people's homes.

III. Urban Beach Entertainment Complex and Lagoon Parameters

According to the present invention, a man-made publicly accessible urban beach entertainment complex is provided, wherein the complex comprises a centerpiece large tropical-style pristine-clear lagoon with a tropical look and feel.

It is important to note that these urban beach entertainment complexes from the present invention are not anticipated to include the use of artificial surf wave generation technologies in the tropical-style man-made lagoon. Use of such technologies and devices would interfere with practicing other types of watersports such as boating, kayaking, paddle boarding and use of small watercraft. However, it will also be appreciated by those of skill in the art that an artificial surf wave generator might be employed in an adjacent pool area not connected to the lagoon (and/or connected by a narrow channel).

The tropical-style pristine-clear lagoon according to the urban beach entertainment complex of the present invention has a bottom, a perimeter, and a minimum surface 8,000 $m^2$-10,000 $m^2$ in order to create a beach lifestyle and a tropical look and feel in the publicly accessible urban beach entertainment complex. The use of smaller lagoons would not mirror a tropical setting. Instead, it would resemble a conventional backyard or hotel swimming pool that does not provide the conditions necessary to feel immersed in an idyllic beach lifestyle.

Additionally, the tropical-style lagoon has a maximum surface of about 200,000 $m^2$ since larger surface areas do not result in the desired look and feel. For example, when the lagoon areas surpass 200,000 m$^2$ and a person looks toward the opposite shore, he or she may not see the opposite waterfront area along with additional facilities and amenities. Thereby, the desired waterfront recreational experience as disclosed in the present invention is not created. It will be appreciated by those of skill in the art that the lagoon may be arranged and configured in such a manner as to have a length which is longer than a width. In such an instance, larger sizes may be constructed while still achieving the desired look and feel.

Figure 2:
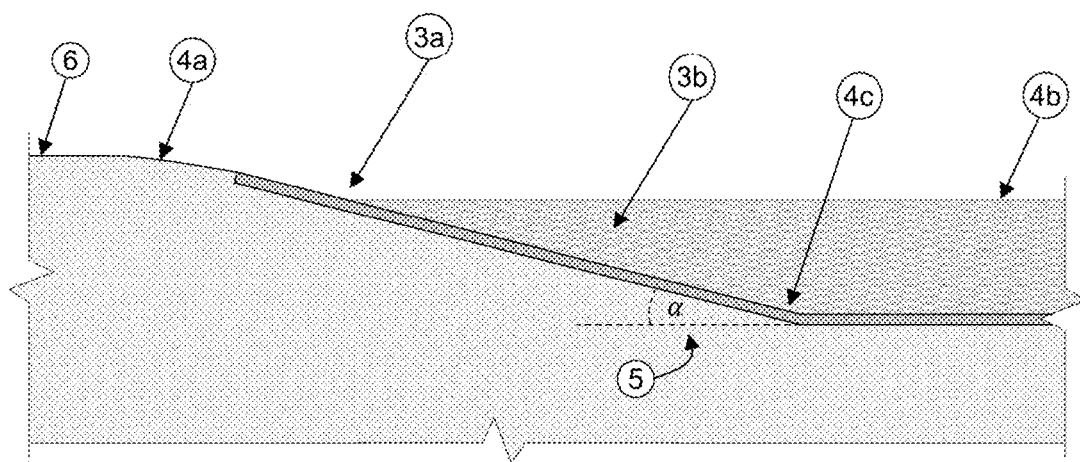
FIGS. 2 and 3 show a side schematic view of an embodiment of the zero-entry edge and chemical application system

Turning now to FIG. 1A, a representative urban beach recreational complex 1 with a centerpiece tropical-style man-made lagoon 2 is illustrated. The lagoon 2 comprises at least one zero entry beach area 3a, a bathing zone 3b, and a water sports zone 3c, each of which are located within the large tropical-style man-made lagoon 2. FIG. 2 illustrates a schematic side view of an embodiment of the zero-entry beach edge 3a.

Now with reference to FIGS. 1A and 2, the bathing zone 3b is adjacent the zero-entry beach edge 3a, wherein the zero-entry edge preferably resembles the natural, soft slope of a tropical beach or a natural lake. The zero-entry edge creates an entry into the lagoon starting generally at an elevation slightly above the mean water level 4a, passing through the mean water level at the lagoon perimeter 4b and continuing to drop below the mean water surface toward the center 4c of the lagoon. The slope of the zero-entry edge, represented by the angle α designated at 5 in FIGS. 2 and 3) is defined by the angle between the horizontal line (generally parallel to the mean water surface) and the sloped beach entry. Preferably the angle is between 5% and 30%. This range generally resembles natural beach edges with soft slopes and provides people on the beach area 6 and bathers an unobstructed and good view of the vast crystal-clear waters.

Figure 3:
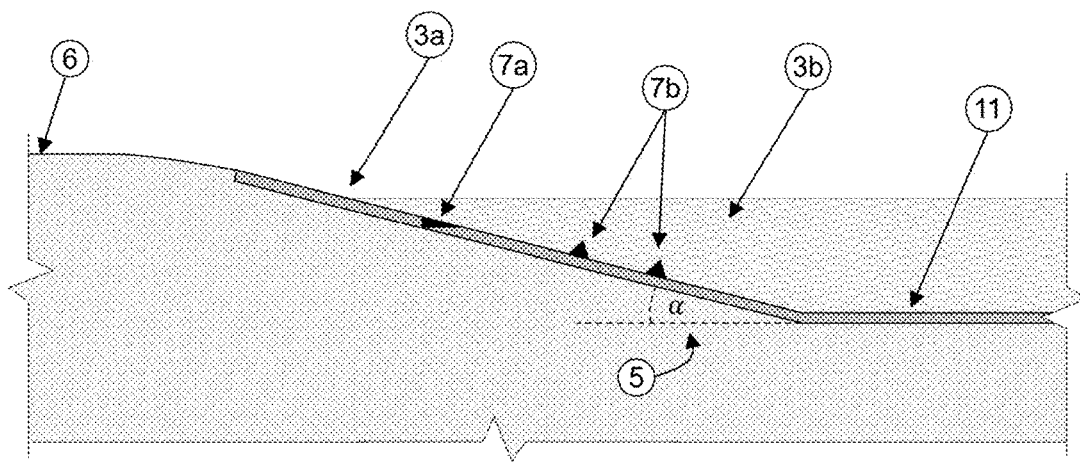
Figure 4A:
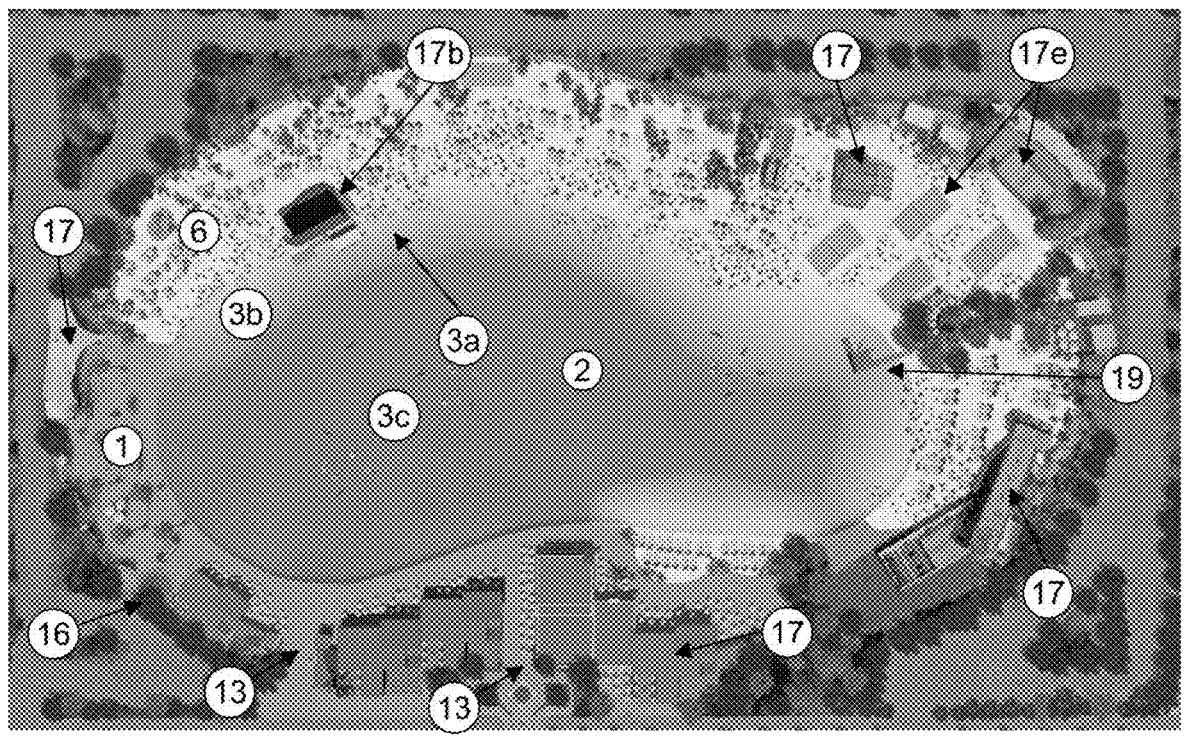
FIGS. 4A, 4B, 5A, 5B, 6A, 6B, 7A, and 7B show different embodiments of the urban beach entertainment complex according to the system and method of the present invention.
Figure 4B:
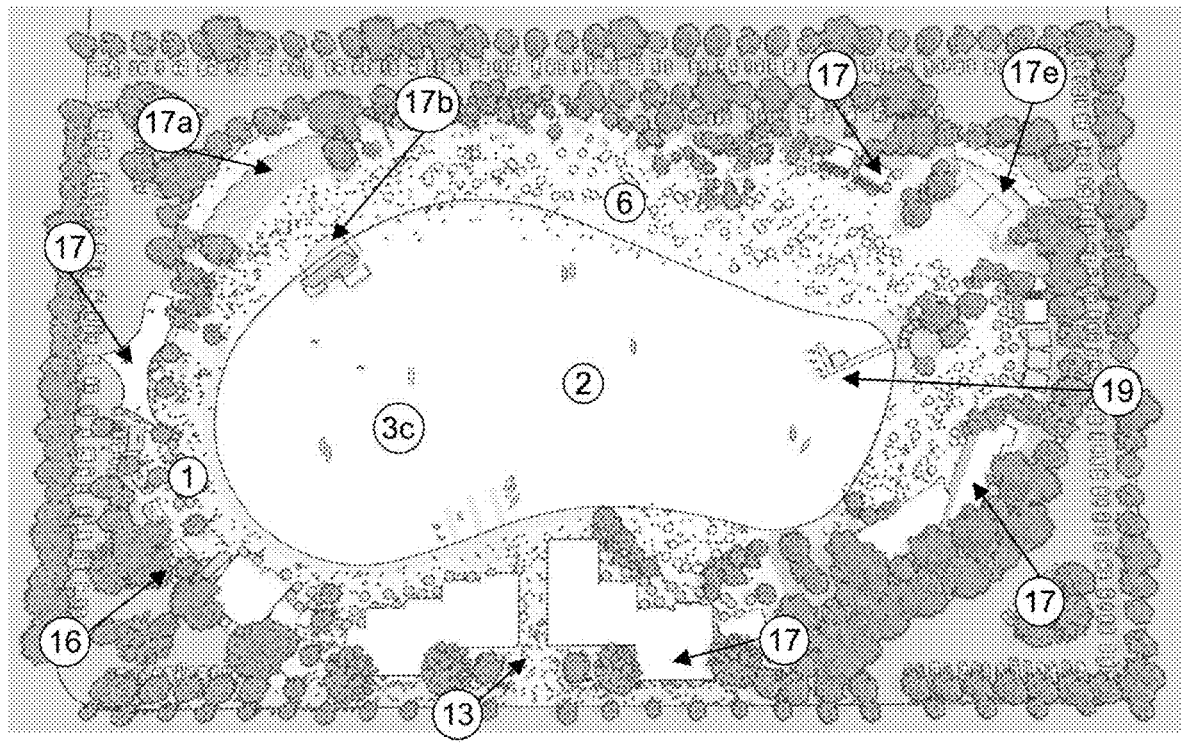
Figure 5A:
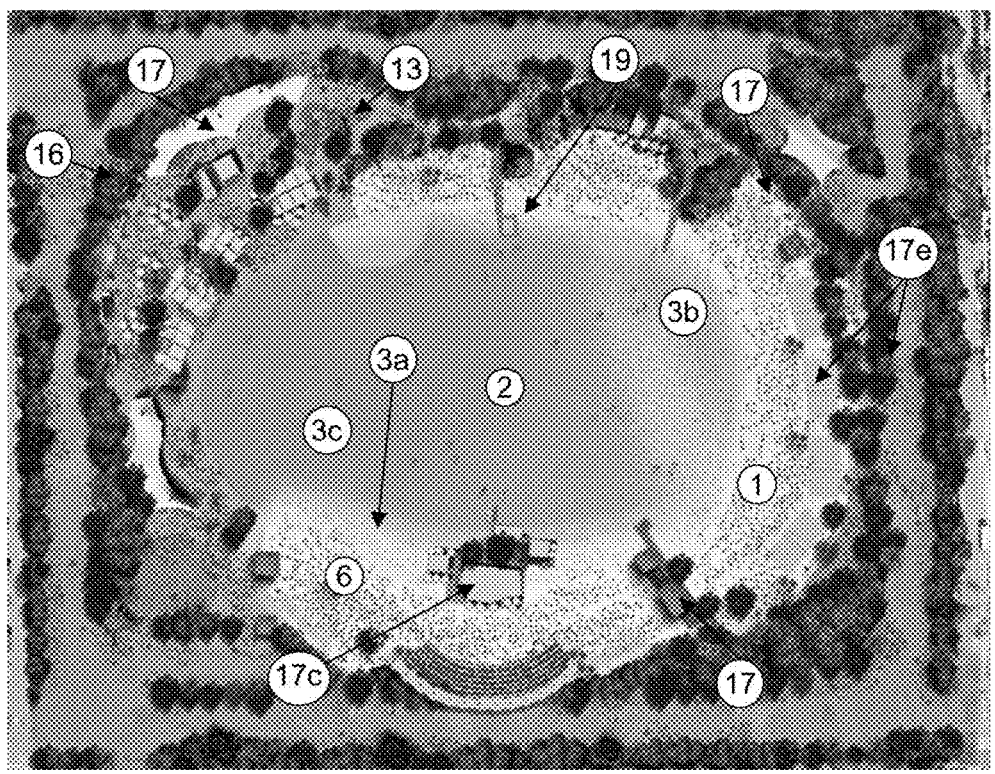
Figure 5B:
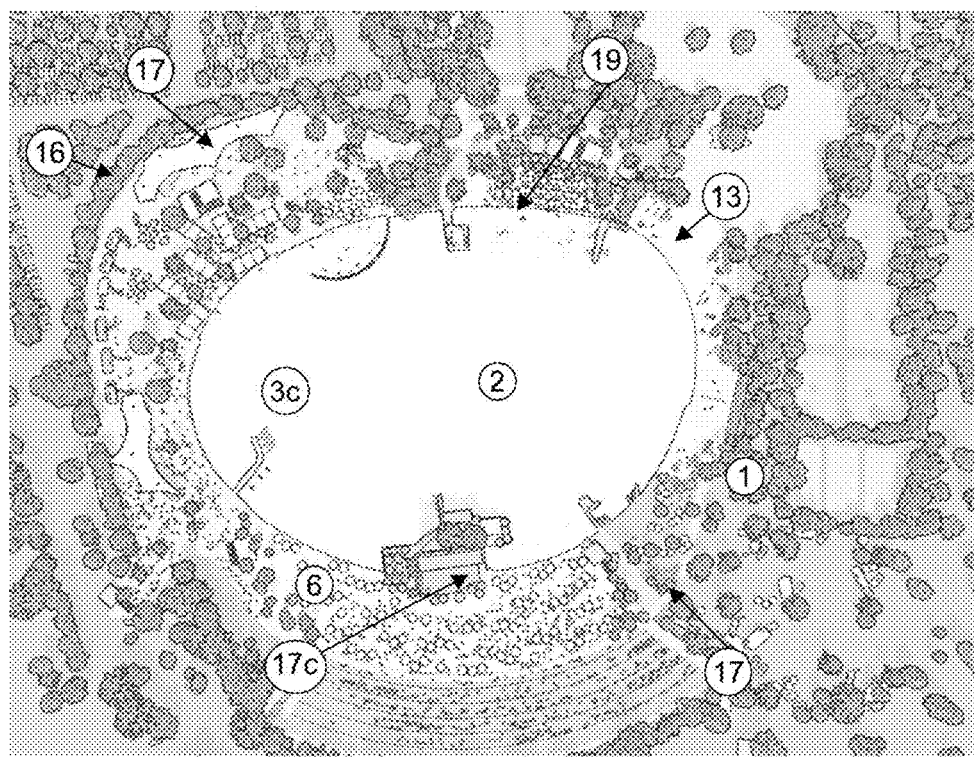
Figure 6A:
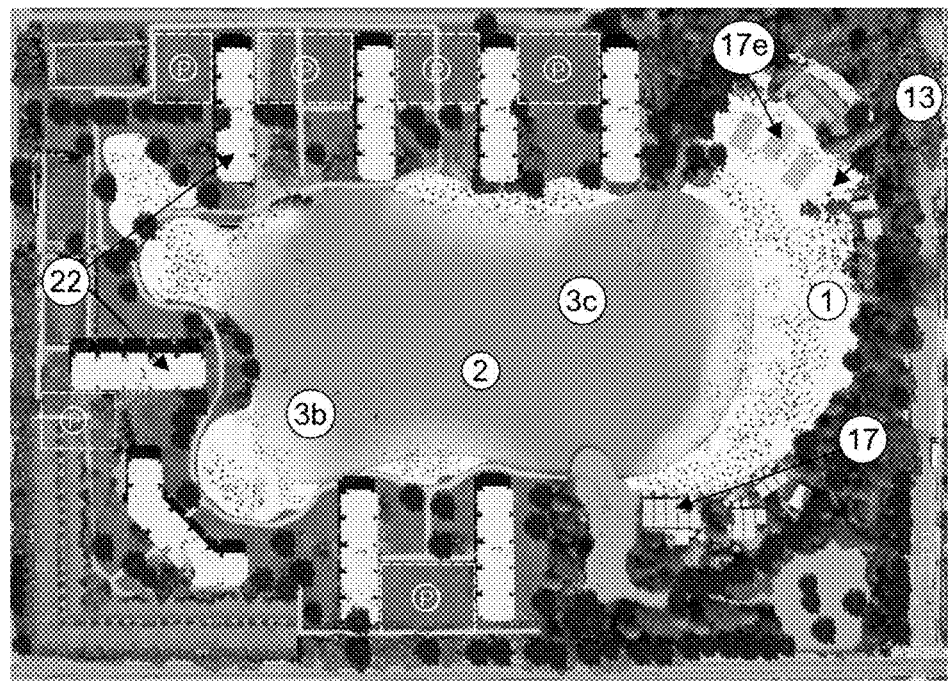
Figure 6B:
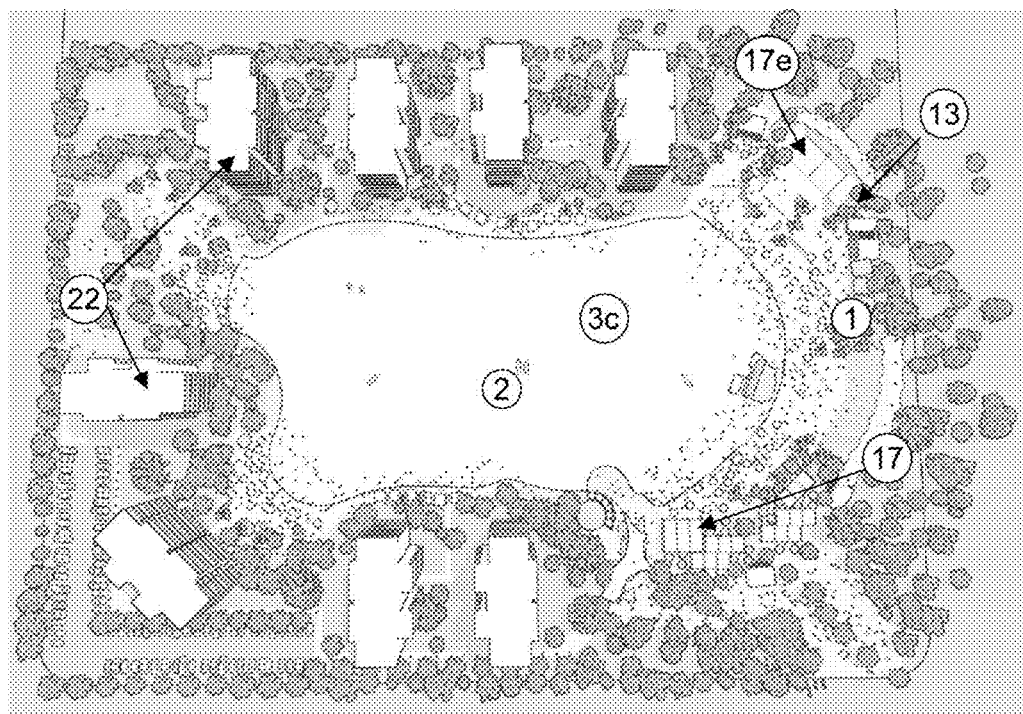
Figure 7A:
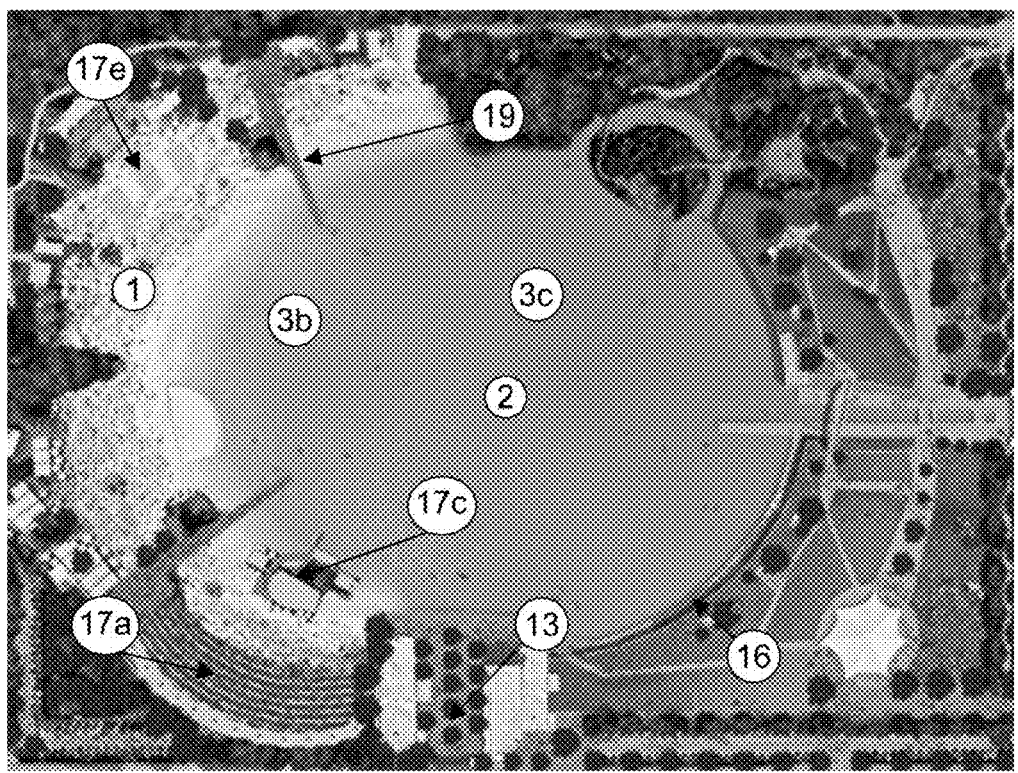
Figure 7B:
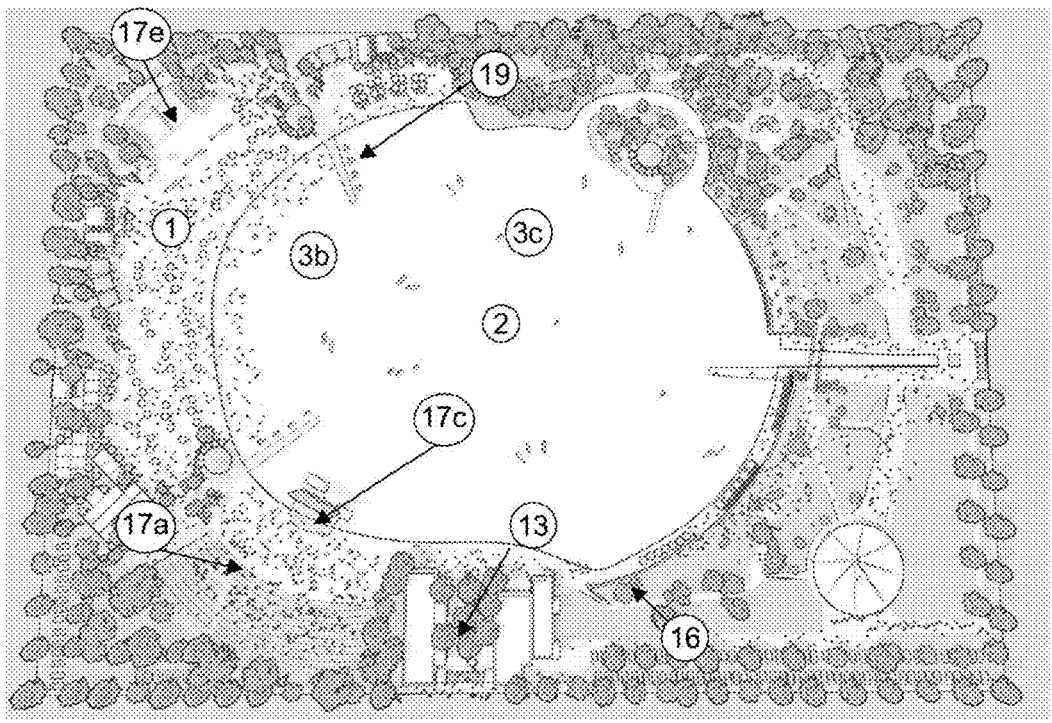

Also, the bathing zone 3b includes a localized disinfection system that provides an increased chemical concentration in such zone. The localized disinfection system comprises a dispensing outlet arranged and configured to apply disinfecting chemicals to the water volume within the bathing area. The localized disinfection system is best seen in FIG. 3 wherein a perimeter chemical application system 7a and bottom chemical application system 7b are shown. The chemical application system includes one or more systems selected from the group comprising nozzles, injectors, jets, piping, and inlets.

The chemical application system may be located in the perimeter of the lagoon and generally bounded by the swimming zone, whereby the primary influence of the disinfecting chemicals is mainly within the swimming zone. The chemical application system may be preferably located in the bottom of the swimming area, including a plurality of dispensing outlets, with the dispensing outlets being located at the bottom of the lagoon within the swimming zone, whereby the primary influence of the disinfecting chemicals is mainly within the swimming zone. There can also be combinations of perimeter chemical application systems 7a and bottom chemical application systems 7b. It will be appreciated that the number and specific location and configuration of the selected chemical application system is best defined on a case by case basis, taking into account the potential number of bathers, water volume, water flows within the swimming area into the rest of the tropical-style lagoon, among others.

Referring again to FIGS. 1A and 1B, the water sports zone 3c comprises a minimum water depth range of at least greater than 1.5 meters and preferably greater than 1.8 meters. This minimum depth allows the practice of water sports that would not be possible in conventional small-sized swimming pools. The water sports zone can have a variety of different slopes at the bottom, depending on its design and configuration. With total lagoon 2 size between 10,000 and 200,000 m$^2$, a series of water sports can be practiced in the water sports zone 3c, such as sailing, boating, canoeing, kayaking, tubing, water skiing (barefoot skiing, cable skiing, jet skiing,), flyboarding, paddleboarding, parasailing, rowing, wakeboarding, windsurfing, kiteboarding, kitesurfing, among others. Preferably, for practicing aquatic sports such as water ski and similar, the size of the lagoon 2 must be approximately 15,000 m2 or more.

As previously mentioned, conventional swimming pools located in water parks are small, usually in the range of 1,000-1,500 m$^2$, with maximum depths of generally less than 1.5 meters. Therefore, they do not convey the feeling of being in the beach or generate a beach lifestyle, and do not allow the practice of several water sports. On the contrary, the tropical-style pristine-clear lagoon 2 constructed in accordance with the principle of the present invention, in the deepest part of the water sports zone 3c, has a minimum bottom depth of 1.8 meters—and in much of the water sports zone 3c are often even deeper. This allows practicing innumerable water sports with various craft that are not found in conventional swimming pools.

Referring now to FIGS. 4A, 4B, 5A, 5B, 6A, 6B, 7A and 7B, several possible embodiments of a complex are shown, with similar items and structures identified with similar designations. In the various embodiments, at least one sand beach area 6 is provided, which surrounds the large tropical-style pristine-clear lagoon 2, wherein the sand has a light color resembling a tropical beach. In a preferred embodiment, the sand colors are similar or in the range of the following colors according to the RAL color scale: RAL 9001, RAL 9002, RAL 9003, RAL 9010, RAL 9016, RAL 9018, RAL 1001, RAL 1014, RAL 1004 or similar colors.

The sandy beach areas 6 are generally configured directly in front of the zero-edge beach edge 3a located in at least a portion of the perimeter of the centerpiece lagoon, in order to provide the feeling of coming out of the water onto the beach. The beach areas 6 and additional rest areas have a minimum surface are to allow recreational, educational, sports, and commercial activities. The beach areas 6 and additional rest areas have a surface preferably of at least 2,500 m$^2$ which allows significant use of such area for different activities such as concerts, plays, screenings, sports, among other activities and events.

Also, contrary to conventional pools that have hard edges and closed shapes, the tropical-style centerpiece lagoon is preferably designed to have curved shapes with round corners that are associated with natural water bodies and beaches, conveying the feeling of being in an idyllic beach paradise.

Further, in an embodiment of the invention at least one portion of the urban beach entertainment complex comprises the use of trees and plants to create a tropical look. In a preferred embodiment, the vegetation 8 resembling a tropical setting is located in the beach areas or additional rest areas surrounding or nearby the zero-entry beach edges 3a and/or sand beach areas 6.

Figure 8:
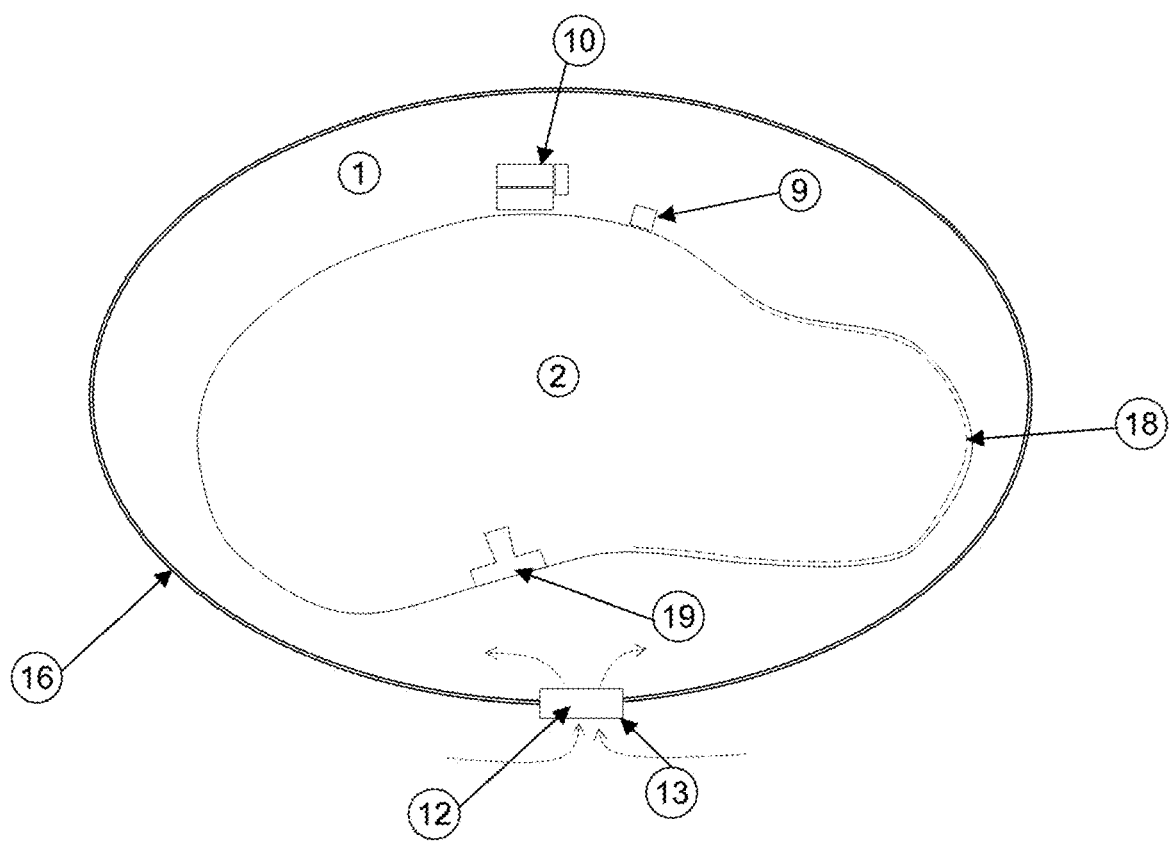
FIG. 8 shows a schematic configuration of the urban beach entertainment complex along with its physical barrier, access control system, and other features.

Referring to FIG. 8, the urban beach entertainment complex 1 further includes a water supply system 9 operatively connected to a water supply, comprising a source, pumps, devices, and other appropriate fluid conduits for supplying filling and make-up water to the lagoon 2. It will be appreciated by those skilled in the art that the devices and conduits for supplying filling and make-up water to the lagoon include piping, nozzles, waterfalls, inlets and outlets, and valves, among others. The water make-up system is preferably arranged and configured to supply filling and make-up water to the lagoon in order to maintain a water volume of at least 80% of the designed water volume permanently in the water body.

The make-up water must have iron and manganese concentrations of up to 2 ppm in order to provide the centerpiece tropical-style pristine-clear lagoon with suitable water that will not change its appearance when undergoing treatment. It will be appreciated by those skilled in the art that, for example, water with high iron and manganese concentrations cause a very noticeable color change when being treated. Also, turbidity of the make-up water should not be higher than 8 NTU in order to avoid having cloudy water (i.e., such water will not provide a tropical look and feel and transparency). Since the levels of filtration in the centerpiece lagoon of the present invention are lower than the ones used in swimming pools, it is important to control the inlet water quality and that it complies with the above parameters.

The man-made tropical-style pristine-clear lagoon 2 of the present invention, is preferably the centerpiece of the urban beach recreational complex 1 and is built and maintained with innovative technologies that achieve low construction and operation costs. Such costs are up to 10 times lower than construction costs associated with conventional thick concrete or tile bottoms used in swimming pools. Further, such operation costs are up to 10 times lower than conventional swimming pool operation costs that require filtration of the complete water volume 4 times per day.

By having low construction and operation costs, and at the same time allowing to achieve an aesthetically pleasing and high physicochemical and microbiological water quality, a publicly accessible urban beach entertainment complex 1 is provided in a cost efficient way. Accordingly, the method of the present invention provides a cost-efficient use of sites that are vacant, previously underutilized, or that are contiguous to, or nearby recreational, educational, sports, or commercial venues, providing thus profitability to such sites.

In order to provide a cost efficient urban beach entertainment complex, the construction methods for building the lagoon shell must typically not include a concrete bottom of the type used in construction methods for swimming pools in the majority of the lagoon. Conventional swimming pool construction requires that the shell of the pool (bottom and walls) is built out of concrete with a specific thickness, generally with a minimum of 2 to 6 inches, and that may be reinforced in order to provide structural stability and resistance based on the type of soil found below the pool. Also, such bottom concrete is generally either painted with a waterproof coating or is covered with tiles, making the construction process more difficult and expensive.

On the other hand, the present invention requires that a large portion of the bottom of the large centerpiece tropical-style lagoon is covered with a flexible plastic material to provide waterproofing and containment properties, while also providing a different sensation than a typical swimming pool concrete bottom. Preferably, the bottom surface of the water sports zone within the tropical-style pristine-clear lagoon is constructed such that at least 80% of its surface is covered with a flexible plastic material. The plastic material is selected from the group comprising polyvinyl chloride, polyethylene, rubbers, polypropylene, among others. In the preferred embodiment, polyethylene may be utilized. The color of the plastic material ranges from pure white to a light blue or light brown color.

The bottom of the tropical-style lagoon may be additionally constructed with different materials to provide additional layers. In one embodiment of the invention, the bottom of the large lagoon is covered with a mineral layer that creates an essentially stagnant water body for holding the water volume. In another embodiment of the invention, the bottom can be covered with a thin layer of shotcrete, with a thickness of less than 6 inches.

It is important to note that currently, technologies exist for building the large tropical-style centerpiece lagoon for less than $600,000 (US) per acre (such amount will vary based on the country, total size, and specific local variables), and to maintain an excellent physicochemical and microbiological water quality using minimum amount of chemicals and energy, in a cost-efficient manner. As noted above, and in comparison, a conventional water park located in South Dakota, U.S., with three relatively small water features of a combined area of 2,300 m$^2$ has a total direct construction cost of more than US$5 million (resulting in more than US$20,000,000 per hectare in a direct comparison and only considering the water feature surfaces). This is based on a study conducted by the independent engineering firm Stantec, who designed and built such a waterpark located in South Dakota.

Also, the publicly accessible urban beach entertainment complex comprises a low-cost treatment system that provides a water treatment technology that uses at least 50% less electricity compared to conventional swimming pool centralized filtration and disinfection systems. The water treatment technology comprises a filtration system that has a capacity and filtration water volume that is at least 50% smaller than for conventional swimming pool filtration systems that filter the complete water volume four (4) times per day.

For example, using conventional pool technology, for a 30,000 m$^2$ lagoon with a volume of 45,000 m$^3$, the filtration water volumes would be 180,000 m$^3$ per day (in order to achieve filtration of the complete water volume four (4) times per day=45,000 m$^3$×4=180,000 m$^3$/day). On the other hand, the present invention's preferred water treatment technology includes a filtration system that filters at least 50% less than that of a conventional swimming pool filtration system. Following the same example, the filtration capacity of the present invention and water volume would be a maximum of 90,000 m$^3$/day, thereby achieving considerable electricity and equipment savings.

Also, embodiments constructed in accordance with the present invention's urban beach entertainment complex comprise a low-cost reduced centralized filtration system as part of the low cost treatment system, which has at least one of a lower number of bottom inlets or a lower filtration rate compared a conventional swimming pool, so that a Filtration Efficiency Index of less than 80% of the Swimming Pool Filtration Index is achieved.

As used herein, the low-cost reduced centralized filtration system refers to a system that uses less inlets, outlets, skimmers, and/or filtration equipment than a conventionally designed and operated swimming pool, and therefore is not intended to achieve the same recirculation pattern and/or filtration rate than a conventionally designed centralized swimming pool filtration system. Generally, the low-cost reduced centralized filtration system uses a fewer total number of bottom inlets to return water to the water volume within the structure, also generally requiring a smaller filtration capacity that allows filtering a smaller water volume and providing less homogeneous filtration compared to a conventional swimming pool centralized filtration system. To provide clarity, the low-cost reduced centralized filtration system does not aim at filtering the water from the mobile suction device described herein, but aims at filtering the water volume contained within the centerpiece lagoon.

Specifically, the low-cost reduced centralized filtration system LCRCFS comprises at least one of a lower number of bottom inlets, or a lower filtration rate compared to a conventionally designed and operated swimming pool, as long as such LCRCFS achieves a Filtration Efficiency Index (FEI) of less than 80% of the Swimming Pool Filtration Index (SPFI) as based in Florida swimming pool regulations as defined below:

$$\text{Filtration Efficiency Index } (FEI) = 100 \times \frac{\#BI \times TRR}{Ws} \quad \text{(Equation 1)}$$

$$\text{Swimming Pool Filtration Index } (SPFI) = \quad \text{(Equation 2)}$$
$$100 \times \frac{\#BI_{FL} \times TRR_{FL}}{Ws}$$

$$FEI \leq 0.8 \times SPFI \quad \text{(Equation 3)}$$

Where:
- #BI is the total number of bottom inlets found in the lagoon
- $\#BI_{FL}$ is the total number of bottom inlets of a conventionally designed swimming pool according to Florida Swimming Pool Regulations for the same dimensions of the centerpiece lagoon
- TRR is the theoretical filtration rate which is calculated as the theoretical numeric calculation for the number of times the total volume of water is recirculated and filtered through the low-cost reduced centralized filtration system of the centerpiece lagoon per day.
- $TRR_{FL}$ is the theoretical filtration rate from Florida Swimming Pool Regulations.
- Ws is the water surface of the centerpiece lagoon in square feet.

Therefore, the low-cost reduced centralized filtration system has a Filtration Efficiency Index of less than 0.8 or 80% of the Swimming Pool Filtration Index, which is related to the use of at least one of a lower number of total bottom inlets or a lower filtration rate compared with a conventionally designed and operated swimming pool.

The low-cost reduced centralized filtration system may be able to filter a lower volume compared to a conventionally designed and operated swimming pool, of for example at least 20% less volume within a 24-hour period, or at least about 30% less volume, or at least about 40% less volume, about 50% less volume, about 60% less volume, about 70% less volume, about 80% less volume, about 90% less volume, or less compared with the filtration rate required to homogeneously filter the complete volume water volume four times per day, so that a Filtration Efficiency Index of less than 80% of the Swimming Pool Filtration Index is achieved.

Also, the total number of bottom inlets from the large centerpiece lagoon and water treatment system of present disclosure is defined as being less than the total number of bottom inlets required in regulations in Florida, so that a Filtration Efficiency Index of less than 80% of the Swimming Pool Filtration Index is achieved. For example, in an embodiment constructed in accordance with the invention, the total number of bottom inlets may be at least 20% less than the number of bottom inlets required in regulations in Florida, or preferably half the number of bottom inlets required in regulations in Florida, or more preferably at least 80% less than the number of bottom inlets required in regulations in Florida. For example, the total number of bottom inlets from the centerpiece lagoon may be at least 20% less than the number of bottom inlets required in regulations in Florida, or at least 30% less, or at least 40% less, 50% less, 60% less, 70% less, 80% less, or 90% less than the number of bottom inlets required in regulations in Florida Pool Regulations.

In an embodiment of the invention, the centerpiece tropical-style lagoon uses a modular treatment system 10, wherein the modular treatment system includes one or more elements selected from the group comprising a containerized machine room, skid mounted systems, and/or water treatment equipment. In a preferred embodiment, such modular treatment system is arranged and configured to be plug and play. This facilitates its connection to other elements, equipment, systems, piping, and structures. In another embodiment of the invention, the modular treatment system 10 is portable and can be deployed and installed on site in a short period of time. As another advantage, the modular treatment system 10 may be operated on a temporal basis, depending on seasonality, its configuration and demand. An example of a preferred modular treatment system which may be utilized in connection with the present invention is a set of containers that have been manufactured in order to house the different systems and equipment that can be manufactured locally or outsourced from other cities or even countries.

Also, in embodiments constructed in accordance with the present invention, the low-cost treatment system comprises a high-frequency reduced skimmer system HFSS that allows the removal of water from the surface of the volume contained within the centerpiece lagoon (including the upper layer of the water volume in contact with the skimmer), wherein such HFSS has a reduced configuration compared to a conventional swimming pool skimmer system. Generally, a conventional swimming pool skimmer system generally has to be designed and configured to withdraw the complete recirculation/filtration water flow from the pool and be able to send such flow to a filtration system. The skimmer system has to be designed and calculated to handle the total flow of water that needs to be filtered from a conventional swimming pool, which results from filtering the total volume of water at least four times per day.

On the other hand, the high-frequency reduced skimmer system (HFSS) from the low cost treatment system of present disclosure uses a reduced design, wherein the skimmers are positioned and configured to withdraw a lower water volume compared to a traditional swimming pool filtration system. For example, the HFSS may be configured to withdraw at least 20% less volume within a 24-hr period, compared with the withdrawal rate required to homogeneously filter the complete volume water volume four times per day as in Conventional Swimming Pool Centralized Filtration Systems.

The high-frequency reduced skimmer system (HFSS) may be positioned and configured to withdraw said at least 20% less volume within a 24 hr. period, such as at least 30% less, at least 40% less, at least 50% less, at least 60% less, at least 70% less, at least 80% less, or at least 90% less volume within a 24 hr. period, compared with the withdrawal rate required to homogeneously filter the complete water volume four times per day as in Conventional Swimming Pool Centralized Filtration Systems. The HFSS allows to periodically remove surface water from the centerpiece lagoon to send to the low-cost reduced centralized filtration system, wherein the HFSS is configured to operate for at least 20% of the time that the centerpiece lagoon is open for direct contact recreational purposes. The HFFS sends the removed water to the low-cost reduced centralized filtration system, in order to treat and/or filter such water before returning it back into the centerpiece lagoon.

Embodiments constructed in accordance with the present invention also comprise a specially designed low-frequency skimmer system LFSS that removes water from the surface and/or upper part of the centerpiece lagoon during planned or specific situations and with less frequency than the HFSS. The LFSS preferably operates during rain events where an increased volume of water enters the lagoon, and therefore the low-frequency skimmer system is used to provide increased renewal of the upper section through this addition of rainwater into the system, which helps to improve the effect of the low cost high-frequency reduced skimmer system. The low-frequency skimmer system is able to remove water from the lagoon during specific situations such as stormwater events, or during determined increased renewal events with the eventual additional water that has been added.

The use of the low-frequency skimmer system allows providing an additional source of water renewal from the water surface or the upper layer of the water surface, which is generally not affected or is less affected by the micro-renewal of water. In that sense, the LFSS also helps to improve the use of the low cost high-frequency reduced skimmer system, by providing an increased renewal of water through the removal of water located in the upper part of the lagoon during certain events or periods of time. The low frequency skimmer system is generally used during stormwater or rainfall events that cause the water level of the water body to rise into predetermined levels where water must be discharged. Also, the low-frequency skimmer system may also be used during high-renewal events where larger make-up water flows enter the centerpiece lagoon in order to achieve a higher renewal rate, wherein the low-frequency skimmers operate by removing water from the centerpiece lagoon, which allows to create an "open" cycle where make-up water is introduced into the lagoon, and the water that is found in the surface is removed from the centerpiece lagoon when required.

It is important to highlight that the low frequency skimmer system is not just simple overflow from the lagoon into its surroundings, which could happen naturally during a stormwater event if water kept falling into the lagoon such that the volume of water entering the lagoon's basin surpasses the freeboard volume and no other means are used to remove it from the centerpiece lagoon. Embodiments constructed in accordance with the invention require that there is a removal of water from the upper layer of the centerpiece lagoon with specially designed structures that allow efficient removal of water, and therefore a simple overflow into the surroundings of the centerpiece lagoon may not achieve such purpose.

As used herein, the freeboard volume is the volume of water that the centerpiece lagoon could contain in addition to its design water volume. The freeboard volume may change depending on the water level and its variation during time. The present disclosure requires a minimum freeboard volume, such that the minimum freeboard distance between the water level and the top most containment centerpiece lagoon of the water volume is at least 5 cm.

The use of the low-frequency skimmer system improves the effect of the high frequency reduced skimmer system, in order to remove water volume from the upper section of the centerpiece lagoon, which comprises the upper surface of the water, and allows removing surface water as required.

The low-frequency skimmer system is not hydraulically connected to the low-cost reduced centralized filtration system, but instead the water extracted through the low-frequency skimmer system is removed from the lagoon and then treated in a separate system, disposed of, directed to stormwater ponds or stormwater discharge systems, among others. Such water removed through the low-frequency skimmer system is preferably disposed of, in contrast to the low-cost reduced centralized filtration system that returns the filtered water to the structure. However, such water can also be used for irrigation purposes, infiltration purposes, or other purposes, including use of such water for filtration and treatment prior to being used for recreational purposes, among others.

The low-frequency skimmer system may have a perimeter weir configuration, an overflow structure, a perimeter opening structure located in at least one portion of the perimeter of the centerpiece lagoon, or a combination thereof.

Generally, the LFSS configuration is designed based on precipitation data and IDF curves (intensity, duration, frequency curves) for the specific location where the centerpiece lagoon is located, and characteristics of the soil below the structure of the water body. The characteristics of the soil beneath the centerpiece lagoon are determined based on a geotechnical study that determines the capacity of water infiltration and seepage into the soil. Further, it must be taken into account the runoff coefficient, the calculation of water directly falling over the water structure's surface (direct receiving of water). Other variables and methods of calculation may also be used for determining the parameters and configurations of the LFSS. With those variables, at least one storage curve (SC) is determined, which indicates the amount of water that the centerpiece lagoon is able to hold and the rates of holding that water and removing such water from the centerpiece lagoon. Based on experience and in the evaluation of the removal rates from the structure, the LFSS is generally designed to be able to remove a water flow the lagoon. In an embodiment constructed in accordance with the invention, the LFSS includes a weir structure on a length (L) that is wide enough to allow the removal of water at a rate that allows avoiding overfilling the lagoon with water. This means that the LFSS length should be wide enough in order to allow that the water storage curve at the centerpiece lagoon never surpasses the freeboard height or the wall height. The weir length is generally determined by using the leveled method. As an example, a weir structure containing "n" openings, each one with a length of "b" and height "h2" may be used. These openings are located at a height "h1" from the average design water surface. Once the water passes through the h1 distance, the LFSS will start its operation and removes water from the centerpiece lagoon. In a preferred embodiment constructed in accordance with the invention, the LFSS comprises at least one discharge weir structure, which aims at being able to remove water from the centerpiece lagoon. In a further embodiment constructed in accordance with the invention, the weir structure comprises at least two openings for safety and discharge purposes. In such case, the weir structure is generally located within a perimeter wall of the centerpiece lagoon so that the openings can be easily seen and cleaned, if needed.

The low-frequency skimmer system is designed to achieve a discharge of water during determined events, in order to improve the efficiency of the high-frequency reduced skimmer system, wherein a Skimmer Operation Rate is defined as the ratio of operative hours of the HFSS to the operative hours of the LFSS within a 30-day period of time.

$$\text{Skimmer Operation Rate } (SOR) = \frac{\text{Hours of Operation of } HFSS}{\text{Hours of Operation of } LFSS} \geq 10 \quad \text{(Equation 4)}$$

The Skimmer Operation Rate (SOR) then is a number that results from the division of the number of operative hours of the HFSS to the number of operating hours of the LFSS within a 30-day period, and may be calculated from the average numbers of hours that each skimmer system operates. The SOR is defined as being at least 30, wherein this means that the HFSS operates at least 10 times more time than the LFSS. For example, if within a 30-day period of time, the LFSS operated 7 hours, then the HFSS is required to operate at least 70 hours during the 30-day period of time. In the event that the number of hours of operation of the LFSS is 0 during a 30-day period of time, then it is required that the hours of operation of the HFSS is at least 180.

The LFSS design and configuration to achieve a discharge of water during determined events, including rainwater and increased renewal events, has been utilized and tested in several large structures in the United States and around the world in projects using technologies from the present patent's inventor. For these projects, the determination of the discharge water flow from the LFSS has depended on the geographic location of the centerpiece lagoon, the climate variability, local regulations, and IDF curves, among others. For such structures, an Intensity value (from the IDF curves) is used for a Frequency of 100 years (generally such frequency is regulated) and with a Duration of between 1 and 6 hours (which is the approximate time of duration of a storm event). With such parameters and references, the design and configuration of a LFSS has been utilized in the following projects (among other projects):

TABLE 1

LFSS Referential Discharge Water Flows

| Country | Size of Water Body (Hectares) | Design Discharge water Flow for Frequency of 100 years (m3/h) | Storm Duration (hours) |
| --- | --- | --- | --- |
| Argentina | 3.33 | 261 | 6 |
| Dominican Republic | 2.10 | 105 | 6 |
| Mexico | 0.93 | 104 | 6 |
| Paraguay | 2.62 | 246 | 6 |
| Colombia | 3.21 | 386 | 6 |
| United States (Florida) | 3.00 | 170 | 6 |
| United States (Florida) | 2.43 | 189 | 6 |

In a preferred embodiment of the invention, the low-cost treatment system does not generate a noticeable chemical smell in most of the lagoon as in conventional swimming pools that have a permanent 1 ppm residual chlorine level throughout the complete water volume. Since there is practically no noticeable chemical smell in most of the lagoon, it helps achieve the object of providing the look and feel of an idyllic beach with white sandy beaches resembling the Caribbean beaches.

In another embodiment of the invention, the water treatment technology for operating the centerpiece tropical-style lagoon must use at least 50% less chemicals than a conventional swimming pool disinfection system that requires maintaining at least 1 ppm of chlorine permanently in all of the water volume, such as conventional public swimming pool regulations from the CDC (U.S. Center for Disease Control), Rule 64E-9 from the Florida Department of Health, and Title 22-Division 4-Chapter 20 of the California Code of Regulations, among others.

Embodiments constructed in accordance with the present invention also may include a water micro-renewal system, which allows providing a generally permanent and more homogeneous water renewal of the water volume contained within the centerpiece lagoon resulting from the micro-leakage of water passing through the inner bottom surface of the lagoon.

The water micro-renewal system comprises multiple micro-leakage points that allow generating a more homogeneous and permanent renewal of water from the centerpiece lagoon. This more homogeneous renewal of water allows for a highly efficient renewal of water without creating massive dead zones that could result from the use of only a few make-up water pipes or inlets that could generate such dead areas with minimal circulation or movement. The micro-renewal system improves the low-cost reduced centralized filtration system, by having a plurality of micro-leakage points that aim to provide a more homogeneous renewal of water.

A micro-leakage point (31) refers to an area within the inner bottom surface of the lagoon where there is a hydraulic connection between the water volume contained in the lagoon and the soil or filling material under it. Preferably, micro-leakage points are situated throughout the inner bottom surface of the lagoon that is in contact with excavated soil. In another embodiment, the micro-leakage points are situated throughout the inner surface of the lagoon that is in contact with filling material.

Micro-leakage points may be created by the use of systems or materials with pores, holes, and/or spaces that aim at letting water pass through (herein referred to as micro-leakage materials or systems), and may be disposed as a plurality of points dispersed throughout the inner bottom surface of the lagoon so that the water contained within the lagoon is in contact with the soil or filling material beneath it. The micro-leakage points can be created with the use of metallic or plastic valves, discharges or outtake structures, pipes with perforations, porous materials like rocks, stones, or shotcrete, punctures, spaces produced on the joints or welding of plastic materials, spaces that are in direct contact with uncovered soil, netted or grated materials like geotextiles or fabrics, among others.

Micro-leakage materials or systems may be looped, attached, knitted, heat-sealed, induction heat-sealed, or twisted, tied, or other joining methods, as long as they create a plurality of micro-leakage points.

The micro-leakage points generate a water flow through such points, which is removed from the lagoon. In an embodiment constructed in accordance with the invention, a micro-leakage water flow is 0.05 to 0.5 liters per second per hectare of inner bottom surface of the lagoon. Embodiments in accordance with the present invention include a lagoon having a minimum micro-leakage flow, which is defined as at least 10% of the total lagoon's water volume being lost through micro-leakage annually.

It is important that the soil or filling material under the centerpiece lagoon should have a permeability coefficient sufficient enough so that there is no substantial accumulation of water under the lagoon that can affect the integrity of its structure, given that such soil or filling material may continuously receive water from the micro-leakage points. The soil under the lagoon can have different types of permeability, which can be separated in:

Low permeability: Soils with a hydraulic conductivity of less than $1\times10^{-7}$ cm/s Medium permeability: Soils with a hydraulic conductivity of between $1\times10^{-3}$ to $1\times10^{-7}$ cm/s High permeability: Soils with a hydraulic conductivity of more than $1\times10^{-3}$ cm/s The soil under the centerpiece lagoon and the type of solution used below the micro-leakage points are configured to allow the passage of water without generating substantial accumulation of water directly under the micro-leakage points, which may cause structural and/or aesthetic impact to the centerpiece lagoon.

The micro-renewal system improves the low-cost reduced centralized filtration system, since it creates a renewal of water at a smaller scale, but evenly distributed throughout the inner bottom surface of the lagoon, facilitating thus a more homogeneous renewal. This micro-renewal system that improves the reduced low-cost centralized filtration system creates a low-cost efficient filtration system that allows purification of water at much lower capital and operational costs than traditional swimming pools systems.

Still further, the centerpiece tropical-style lagoon 2 may preferably have a natural surface wave motion due to its large surface. The horizontal distance of the lagoon 2 in the direction of the wind can create a fetch length, where the fetch length is the horizontal distance along the open water over which the wind blows and generates waves. Therefore, the look of the tropical-style lagoon's waves allows to achieve a natural look since the waves are similar to the sea—and are very different to the ones created in conventional small-sized swimming pools. Depending on the horizontal distance that is parallel to the wind blowing over the lagoon, the waves created over the lagoon will be higher and similar to the water movement over the sea. The wave height increases exponentially with the fetch length and wind speed, which is an effect not achievable in conventional pools with small sizes.

In an embodiment of the invention, the tropical-style pristine-clear lagoon operates in an essentially closed cycle. In this embodiment, the water volume is not significantly renewed through recirculation with a water source (e.g., a well) and/or an open body of water or river.

In an embodiment of the invention, the tropical-style pristine-clear lagoon has a minimum vertical transparency of 1.2 meters in order to resemble the tropical seas with pristine-clear waters. Such depth allows generating an intense color with crystal clear waters, where the bottom 11 of the tropical-style lagoon allows providing such intense color and tonality due to the effect of the sun's reflection over the bottom and due to the transparency of the water.

There are new and innovative methods for building and maintaining large water bodies with excellent microbiological and physicochemical water quality and high transparency for different uses, which have been protected by patents in the U.S. and around the world, such as described and shown in the following granted U.S. Pat. Nos. 7,820,055, 8,070,942, 8,062,514, 8,790,518, 9,708,822, 9,470,007, 9,080,342, 8,465,651, 9,062,471, 8,753,520, 9,957,693 and 9,470,008. Each of the foregoing patents are hereby incorporated by reference and made a part hereof.

Such innovative methods, systems, and apparatuses have very low construction costs, very low operation costs due to the use of minimal amounts of chemicals and energy for maintaining water quality, and as an alternative, may be used for building and/or maintaining the large pristine-clear lagoons with a tropical look and feel. These patented methods, systems, and apparatuses can be used for building and/or maintaining the large pristine-clear lagoon 2 either by using all technologies, or some of them, or parts as described in such technologies.

The aforementioned incorporated patents describe the various operations and processes for treating the water in large lagoons in a manner which efficiently and economically maintains the water. While reference should be had to such patents for detailed descriptions, a brief description is next presented as a representative method to maintain the water in the public access lagoon. First, the water treatment and filtration process requires collecting water and storing such water in a container having a bottom able to be thoroughly cleaned by a suction device. Second, during a 7 day interval the process requires treating the water in the container by periodically adding disinfectant agents to said water to establish an ORP of at least 500 mV for a period of time dependent on the temperature of the water being treated. Third, the method requires activating the operation of mobile suction means in order to suction a portion of said water in the container containing settled solids to prevent the thickness of settled material from exceeding 3 mm. Lastly, the method requires filtering such portion of water suctioned by the mobile suction means and returning the filtered water to said container. Using these processes, at least 50% less filtration capacity and water volume is filtered compared to a conventional swimming pool filtration system are utilized that requires filtering the complete water volume 4 times per day.

It is important to mention that the previously mentioned patented technologies have been used in real estate developments which have completely different concepts and configurations. In addition, such developments do not consider massive public usage and do not create a meeting point of the 21$^{st}$ century. Instead, the use in real estate developments is very different since such lagoons are intended for use by owners and residents, do not have a public controlled access (e.g., a ticket entry fee) for large scale use, and may not be located in sites with a large urban population concentration. Therefore, they cannot generate the meeting point of the 21$^{st}$ century with surrounding amenities and facilities such as restaurants, amphitheaters, stages, kiosks, rental centers, shopping centers, gyms, promenades, bars, coffee shops, among others. Accordingly, the model for real estate is quite different. However, if there is a real estate development, hotel, or private development near the publicly accessible urban beach entertainment complex, or in one zone in the perimeter of the centerpiece tropical-style lagoon that has private access to such zone, the principles of the present invention require at least one public access zone—that is separated from such developments—and that has a controlled access for public use as a mixed use.

Therefore, as it has been mentioned thorough the specification, swimming pool technologies cannot be scaled into large water bodies. For large water bodies there are some other technologies used—such as the ones used in surf lagoons, aesthetic or ornamental lagoons—but which do not achieve the pristine clear nor water quality conditions of the present invention, and would not be able to create the urban beach entertainment complex of the present invention.

In an embodiment of the invention, evaporation control chemicals are added to the lagoon's water, which allows reducing natural evaporation up to 50% compared with natural evaporation rates. It will be appreciated that the chemicals must be approved for use in recreational water bodies. Examples of a preferred evaporation control chemical include alcohol based evaporation control chemicals or silicon based evaporation control chemicals, which create a non-visible layer on top of the surface water layer and therefore reduces evaporation by avoiding the direct contact between the water surface and the surrounding air. The control chemicals operate under different temperatures and are able to withstand wind conditions. The evaporation control chemical is required to be NSF (National Sanitation Foundation) approved for use in recreational water bodies, either being approved under NSF 50 (for swimming pool chemicals) or NSF 60 (for drinking water chemicals). An example of a preferred evaporation control chemical is the Heatsavr® Crystal Lagoons Formula, manufactured by the company Flexible Solutions of Canada. Such chemical may be added manually, by the water make-up system 9 and/or the modular treatment system 10.

Figure 9:
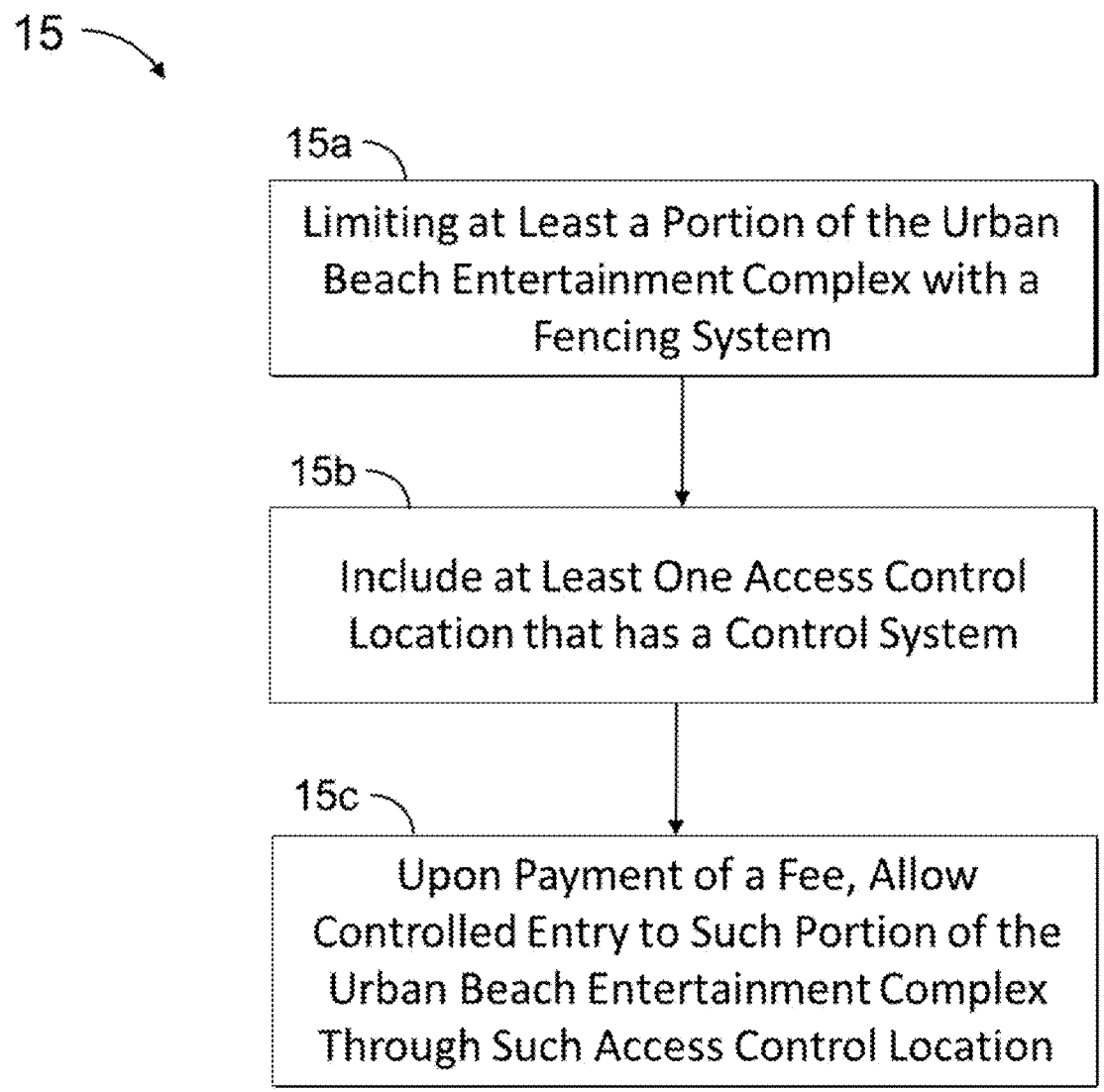
FIG. 9 is a flow diagram describing a preferred sequence for allowing a controlled access to at least one portion of the urban beach entertainment complex through an access control location.

The urban beach entertainment complex also comprises at least one access control system 12 which preferably limits and controls user access on a daily basis to at least a portion of the complex. The access control system is located in at least one portion of the physical barrier 16. The access control system 12 includes one or more access control locations 13 that have a control system 14 to allow controlled entry to the public through such location. Such control system may include gated entries, turnstiles, biometric systems, access readers, security barriers, biometric systems, among others. In a preferred embodiment, the control system comprises a gated entry with a turnstile. Additionally, FIG. 9 shows a sequence 15 in which steps 15a through 15c allow to perform a controlled access upon payment of a fee into at least a portion of the urban beach entertainment complex.

FIG. 8 shows a schematic of an embodiment of the present invention, where a physical barrier 16 limits the entry of people to the urban beach entertainment complex 1, and allowing access to the complex through the access control locations 13.

The public will access the urban beach entertainment complex through the access control locations 13, as the rest of the limits of the urban beach entertainment complex are required to be limited physically to avoid non-controlled access.

Figure 15:
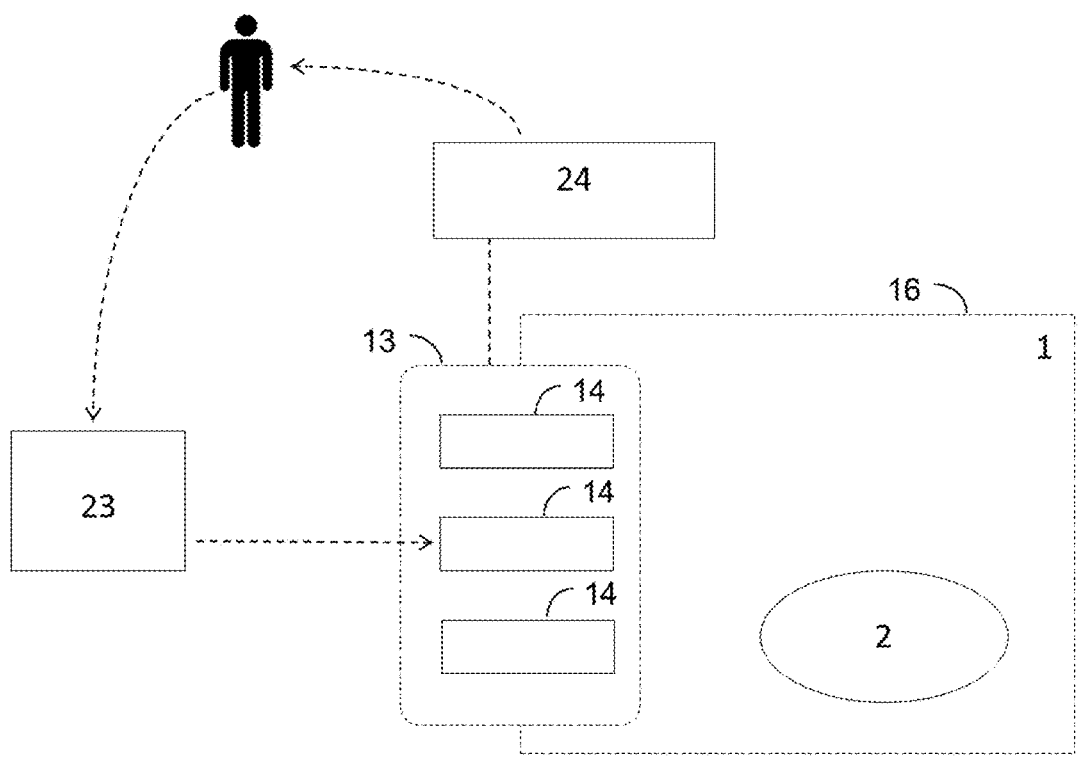
FIG. 15 shows an embodiment of the access control system.
Figure 16:
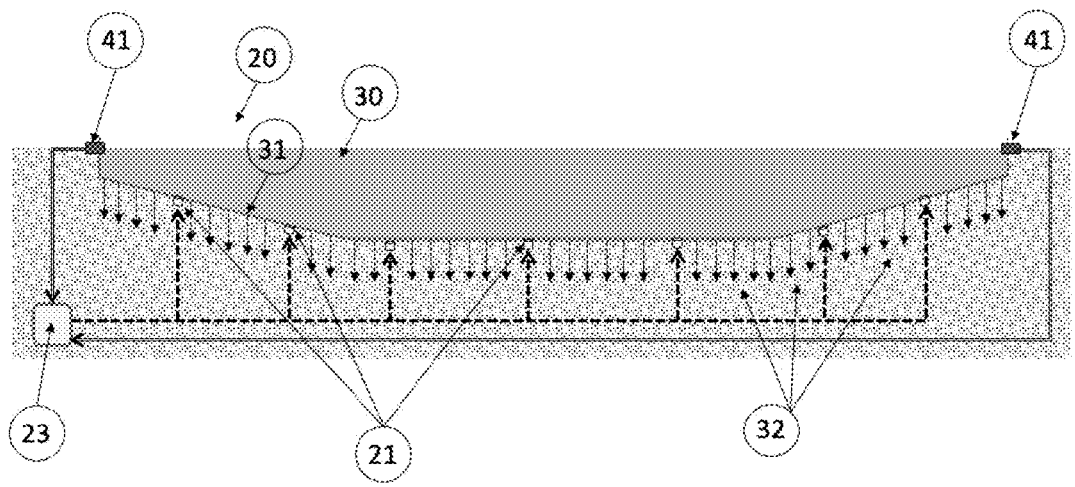
FIG. 16 shows a schematic embodiment of a centerpiece lagoon constructed in accordance with the invention, showing a reduced number of bottom inlets (21), a high-frequency reduced skimmer system (41) a reduced filtration system (23), and micro-leakage water flows (32) flowing through micro-leakage points (31) of the micro-renewal system (30). The low-frequency skimmer system LFSS (42) is not shown.
Figure 17:
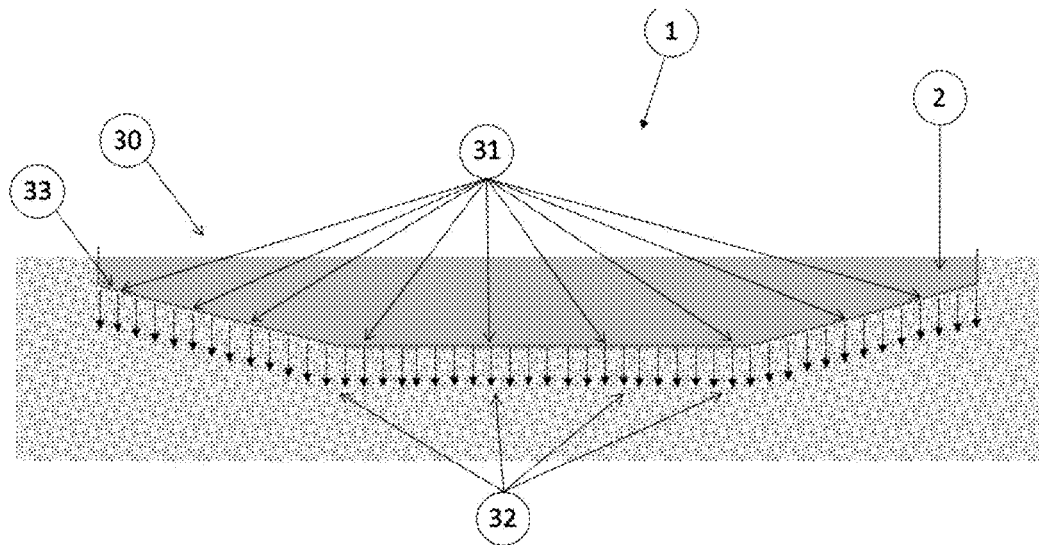
FIG. 17 shows a schematic embodiment of a centerpiece lagoon constructed in accordance with the invention comprising a plurality of micro-leakage points (31) within its inner surface, which allow to remove water from the lagoon since each micro-leakage point (31) has an associated micro-leakage point water flow (32) that is being removed from lagoon and into the excavated soil or filling material (3). The low-frequency skimmer system (LFSS) is not shown.
Figure 18:
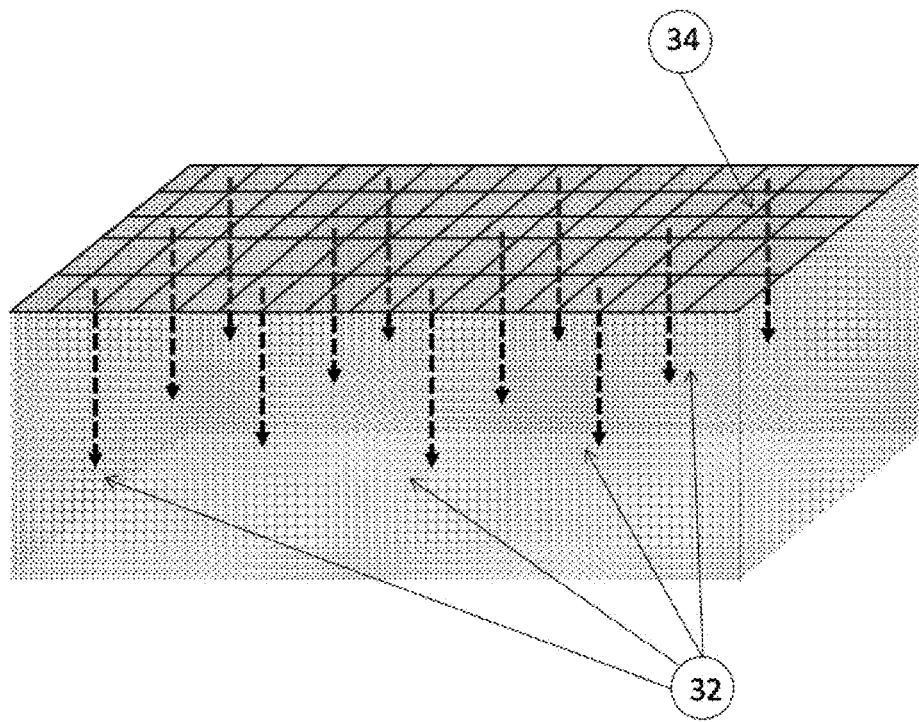
FIG. 18 shows an enlarged section of an embodiment of the micro-renewal system (30) constructed in accordance with the invention, wherein a micro-leakage material (33) is a grid material (34) and is used in the inner surface of the structure, which allows to create micro-leakage points (31) to achieve a micro-leakage flow (32) that is removed from the structure into the excavated soil or filling material (3).
Figure 19:
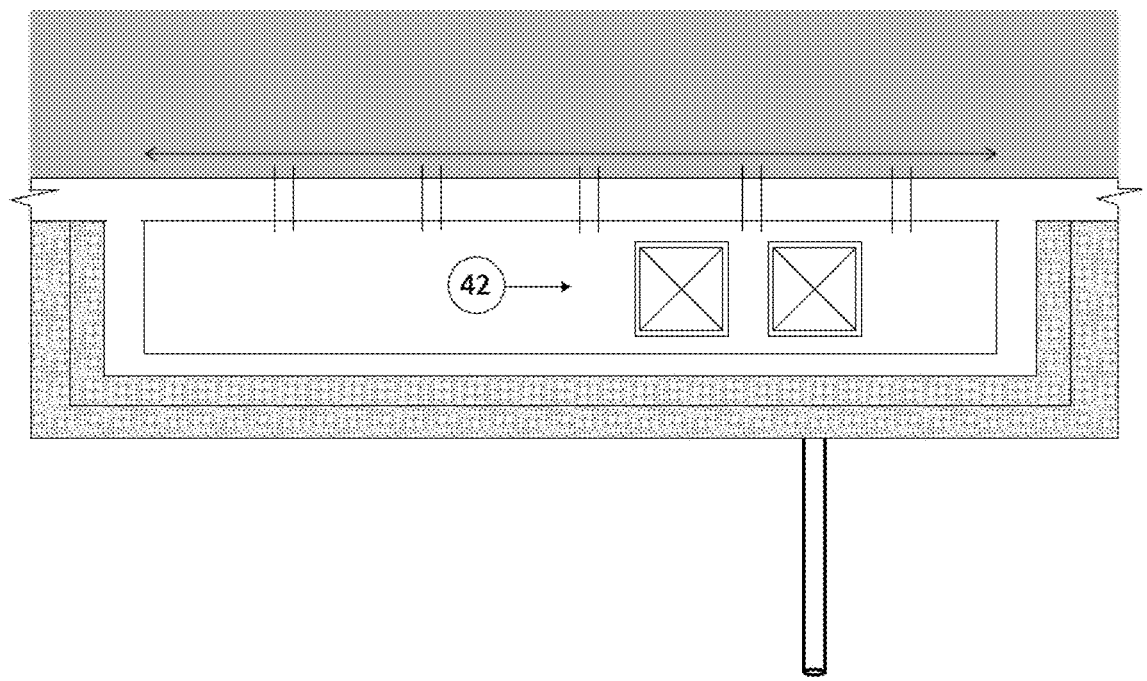
FIG. 19 shows a schematic aerial partial top view of a centerpiece lagoon as well as the low-frequency skimmer system LFSS (42) and one discharge water pipe (6).
Figure 20:
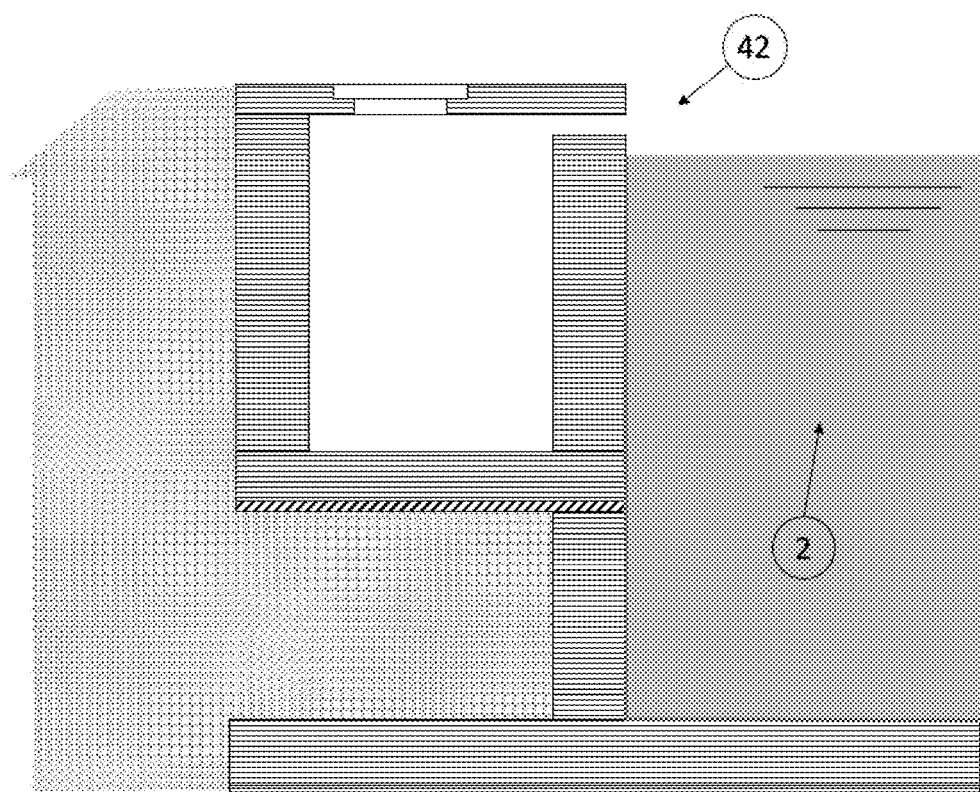
FIG. 20 shows a schematic side view of an embodiment of the low-frequency skimmer system LFSS (42) constructed in accordance with the invention and an opening that is located above the water level.
Figure 21:
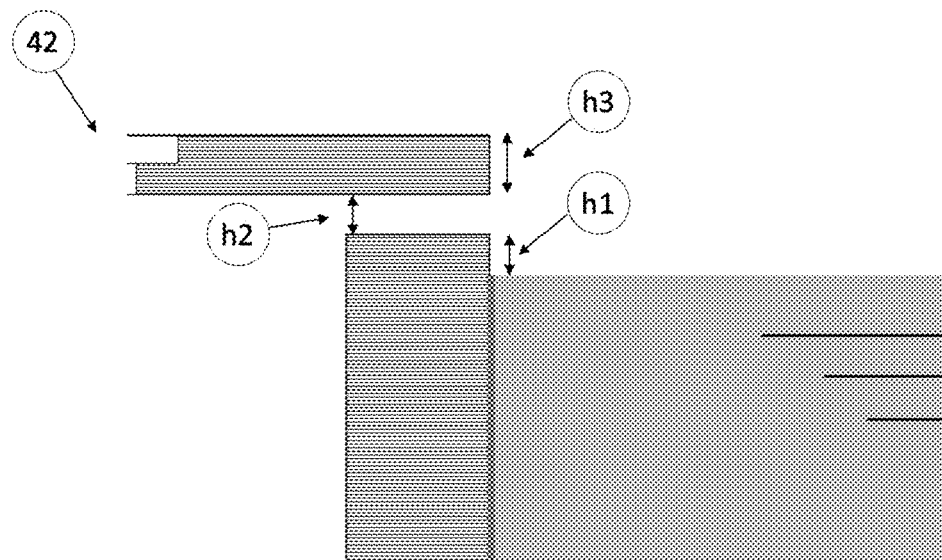
FIG. 21 shows a schematic enlarged side view of an embodiment of the low-frequency skimmer system LFSS (42), and referential heights h1, h2, and h3 that denote a distance from the water level to the lower weir opening point, the height of the weir opening, and the thickness of the weir upper structure, respectively.
Figure 22:
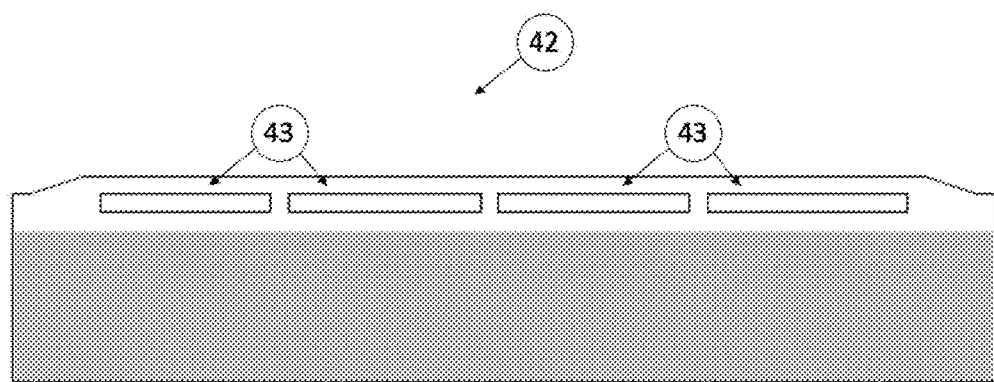
FIG. 22 shows a schematic front view of an embodiment of the LFSS (42), having four weir structures (43) being located with openings above the water level of centerpiece lagoon.
Figure 23:
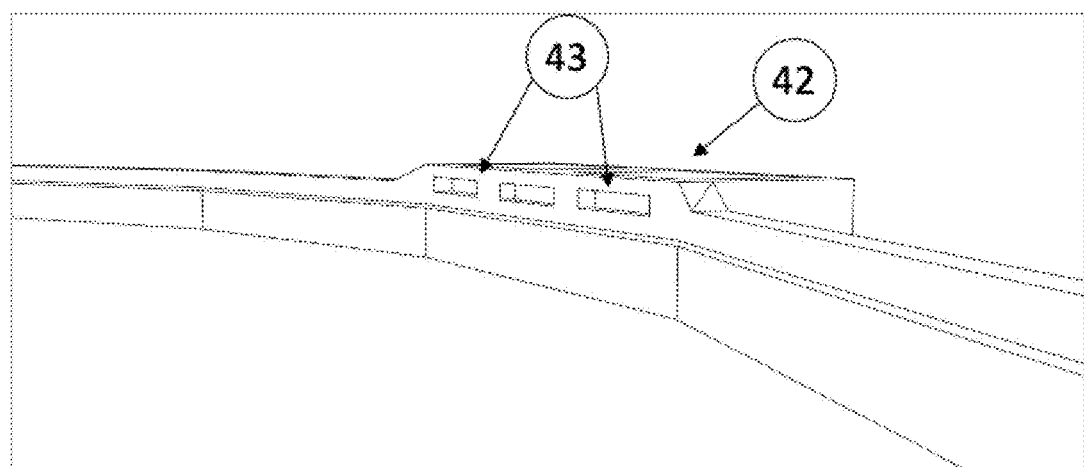
FIG. 23 shows a schematic lateral view of an embodiment of the LFSS (42), having three weir structures (43).
Figure 24:
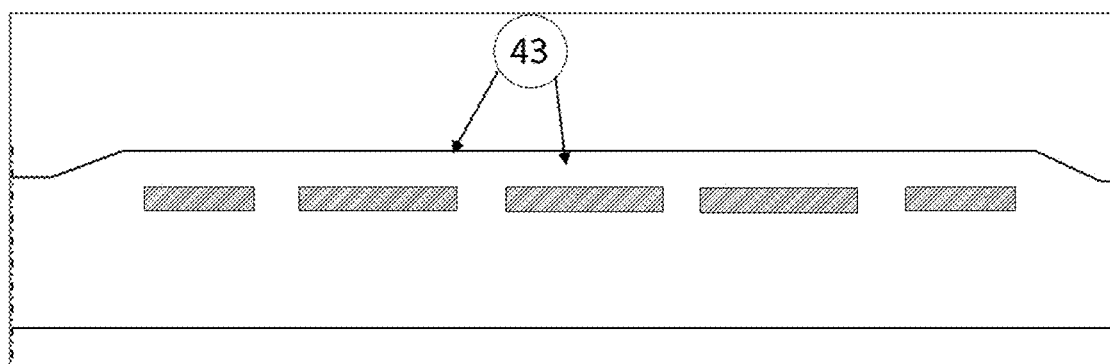
FIG. 24 shows a schematic front view of an embodiment of the LFSS (42), having weir structures (43) being located with openings above the water level of centerpiece lagoon.

FIG. 15 shows an embodiment of the access control system 12 showing a point of sale 24, used when people are paying the entry fee. In another embodiment, people may use their pre-purchased tickets or seasonal passes to access at least a portion of the urban beach entertainment complex, and may not require paying an entry fee on site. In the shown embodiment, a person buys a ticket on site, then optionally passes through a security screening 23, and then uses one of the access control locations 13 comprising at least one control system 14, in this case a turnstile, to access the urban beach entertainment complex.

The access control system is configured to allow public access to the complex, and requires that a specific barrier is employed. Such barrier is defined as a physical limitation structure implemented at the limits of the urban beach entertainment complex, or the portion of it that will be controlled for access. The barrier may include one or more combinations of elements selected from the group comprising fences, walls, moats, natural vegetation, buildings and portions of buildings, or other types of barriers in order to keep the public from accessing the urban beach entertainment complex 1 through a location other than the access control system 13 locations. It will be appreciated that the barriers will vary from complex to complex depending on the location and existing structures (if any). It will also be appreciated that one way emergency exits may be provided in areas of the barriers and/or exits which generally trigger warning horns and sirens.

Preferably, the access control system is configured to allow access to at least 500 people per hour into the urban beach entertainment complex 1, or to a portion of the same. For example, for an urban beach entertainment complex 1 with a total area of 40,000 m$^2$, the access control system 12 may include two different access control locations 13, each one having at least four control systems 14 such as turnstiles that allow the public to go through such turnstiles and access the urban beach entertainment complex at a combined rate of at least 500 people per hour. Preferably at least one of the control systems 14 and access control locations 13 can be opened or closed depending on public demand.

The urban beach entertainment complex also includes at least one ancillary facility selected from the group of commercial, recreational, educational, cultural, residential, and/or sports facilities surrounding the centerpiece tropical-style man-made lagoon in order to allow different activities to be held within the urban beach entertainment complex. The ancillary facilities 17 are selected from the group comprising restaurants, shopping centers, event centers, gyms, stores, sport facilities 17e, and educational or cultural venues based on its configuration, among others. Ancillary facilities 17 are represented in FIGS. 4A, 4B, 5A, 5B, 6A, 6B, 7A, and 7B. Such ancillary facilities and amenities may be sourced from a third party.

The urban beach entertainment complex further preferably includes at least one beachfront amphitheater with stages and/or spaces for housing and/or showcasing different events, educational activities, concerts, cultural activities, sport events, and similar content. Also, the urban beach entertainment complex may comprise at least one large screen for showcasing movies, sport events, conferences, simulcasts, live streaming of content, e-sports, educational activities, events, and similar content.

The urban beach entertainment complex from the present invention may also include an illumination system 18 (best seen in the perimeter of the lagoon 2 in FIG. 8), wherein the tropical-style lagoon is illuminated in order to allow its use at nighttime or under enclosed structures. Underwater illumination allows the clear delimitation of the perimeter of the lagoon 2 and also illuminates the water through underwater lights that create a completely new aesthetic look of the nightlife beach ambiance. The illumination system 18 comprises LED underwater strip lights or underwater spot lights. The illumination system may be used throughout the complete perimeter of the tropical-style lagoon 2, or only in some portions of the lagoon. An embodiment is depicted in FIG. 8, wherein the illumination system 18 is used on a portion of the lagoon 2 perimeter.

Docks 19 (best seen in FIG. 8) may be provided within the pristine-clear lagoon, which is not the case in swimming pools, since the tropical-style pristine-clear lagoons allow the practice of aquatic sports and require docks to access deep portions of the lagoon. FIG. 8 depicts the use of docks 19 within the tropical-style lagoon 2.

IV. Description of Method

Referring now to FIG. 10, a method of the present invention 20 comprising steps 20a to 20g provides a method for an efficient use of facilities and land that are vacant, underutilized, or are contiguous or nearby recreational, educational, sports, or commercial venues by providing a publicly accessible urban beach entertainment complex with a centerpiece man-made tropical-style pristine-clear lagoon. The method provides for a revenue opportunity allowing for the creation of publicly accessible urban beach entertainment complexes that are be located in underutilized or vacant sites with specific population density and access infrastructure, with the objective of generating the meeting point of the 21$^{st}$ century.

The method of the present invention comprises searching and defining a site that has been underutilized or that has no use, wherein the site selection is a key part of the method. Sites that can be selected for this purpose comprise vacant land, underutilized land, and sites that are contiguous or nearby diverse venues, such as recreational, educational, sports, and commercial venues.

Recreational, educational, sports, and commercial venues that may have underutilized contiguous sites comprise event arenas, amusement parks, water parks, museums, stadiums, golf courses, membership clubs, zoos, aquariums, shopping centers, university campuses, casinos, cruise ship ports, speed tracks, horse race tracks, Olympic venues, among other sites.

The site according to the method of the present invention must preferably have a minimum surface of 16,000 m2 in order to create the publicly accessible urban beach entertainment complex, and is strategically located so that it has a minimum surrounding population of 500,000 people within a 50-mile radius.

Figure 11:
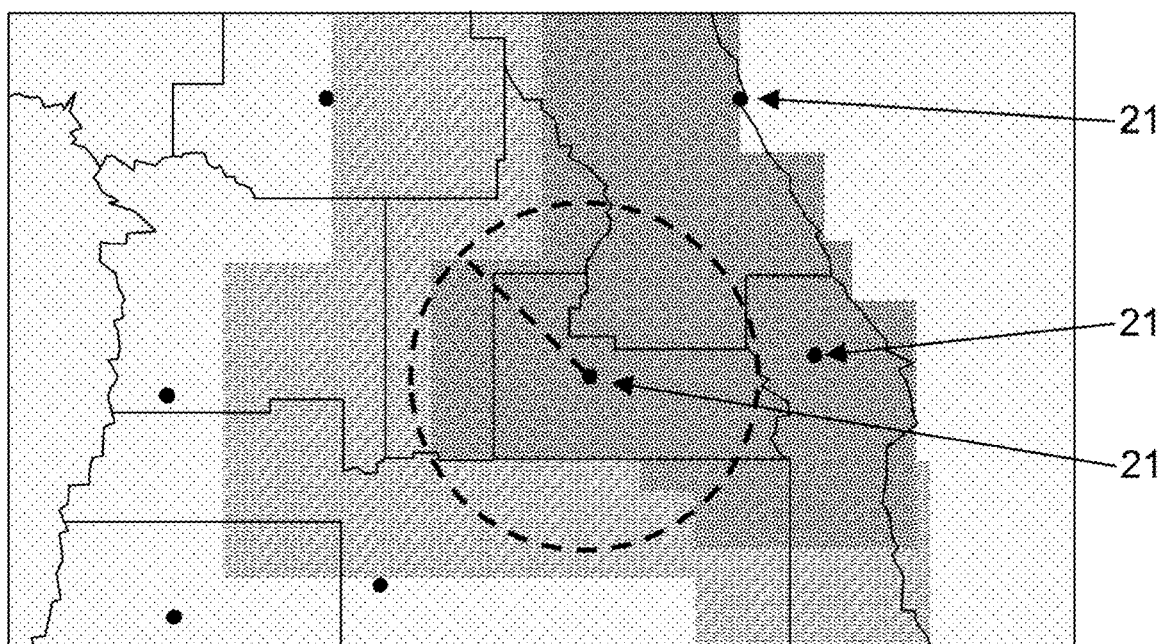
FIG. 11 is an illustrative population density map by which the desired area may be determined in connection with the location of the vacant, limited use, underutilized site, or land that is contiguous to existing amenities or facilities.

As seen in FIG. 11, an illustrative population density map is shown, by which the desired area may be determined in connection with the location of the vacant and/or underutilized site by analyzing the population density surrounding the location of the potential vacant and/or underutilized site 21 within a 50-mile radius. FIG. 11 denotes population density by different color and/or pattern intensity within the image, wherein the selected location is surrounded by a dotted circle line representing a 50-mile radius, and wherein the population analysis has been made and it has been determined that such area has a population density of at least 500,000 people.

The urban beach entertainment complex and method for providing efficient utilization of limited use land from the present invention aim to bring a new way of life and transform urban centers into the meeting point of the 21$^{st}$ century, completely changing urban centers that have high nearby population and providing those people with the possibility of being immersed in a tropical lifestyle close to their homes. These urban centers target the nearby surrounding population, aiming for high repetition rates of people going into the urban beach entertainment complex to have a favorable experience, shop, participate in cultural activities, watch movies, practice water sports, have lunch or dinner, grab a cup of coffee, or other activities. Creation of such complexes may very well have an important impact as it is intended that such urban beach entertainment complexes will have significant attendance.

Figure 12A:
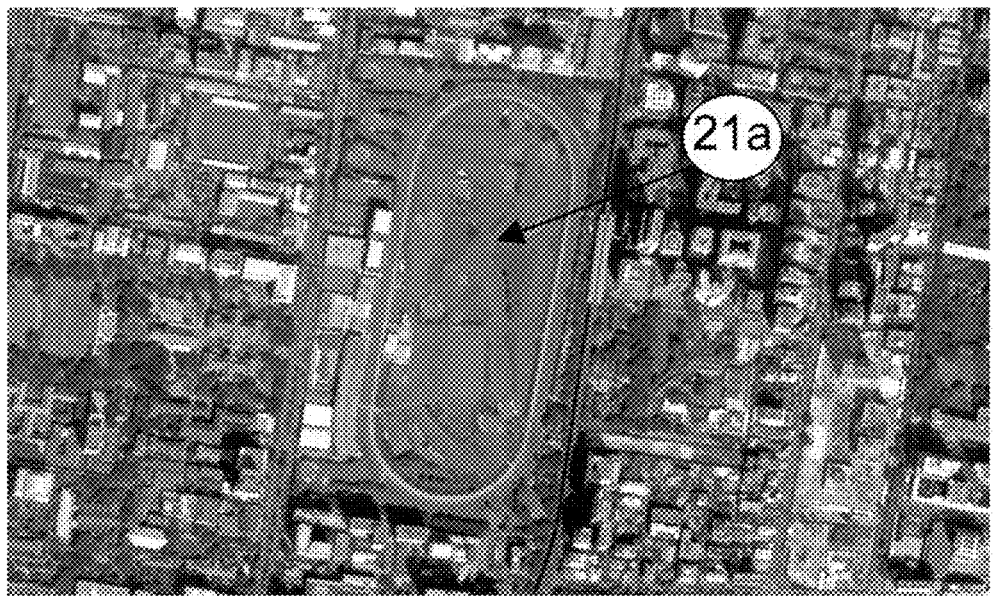
FIGS. 12A and 12B show a top plan schematic layout of an embodiment of the urban beach entertainment complex constructed within the central space of a horse racecourse.
Figure 12B:
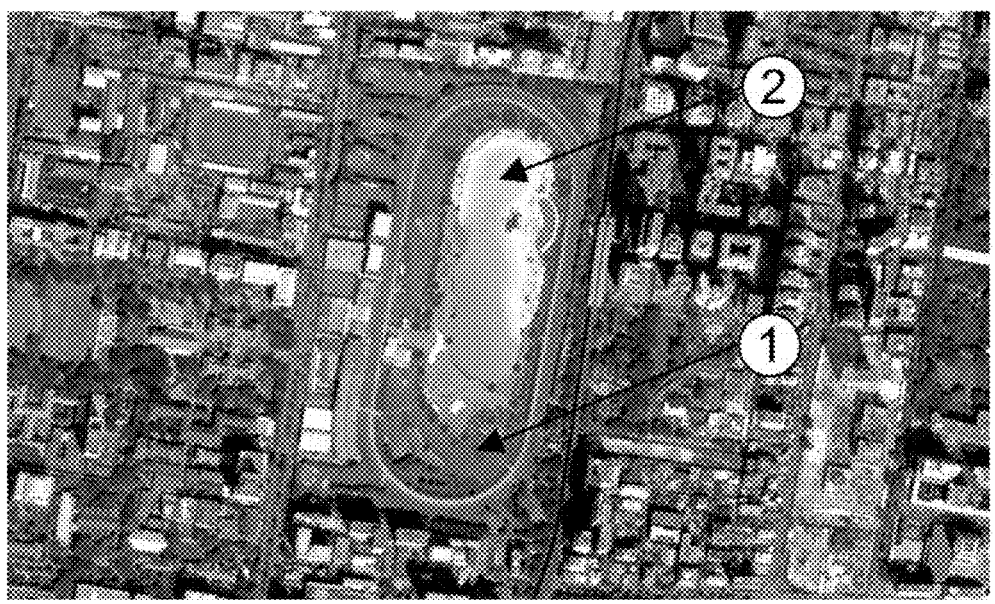
Figure 13A:
Figure 13B:
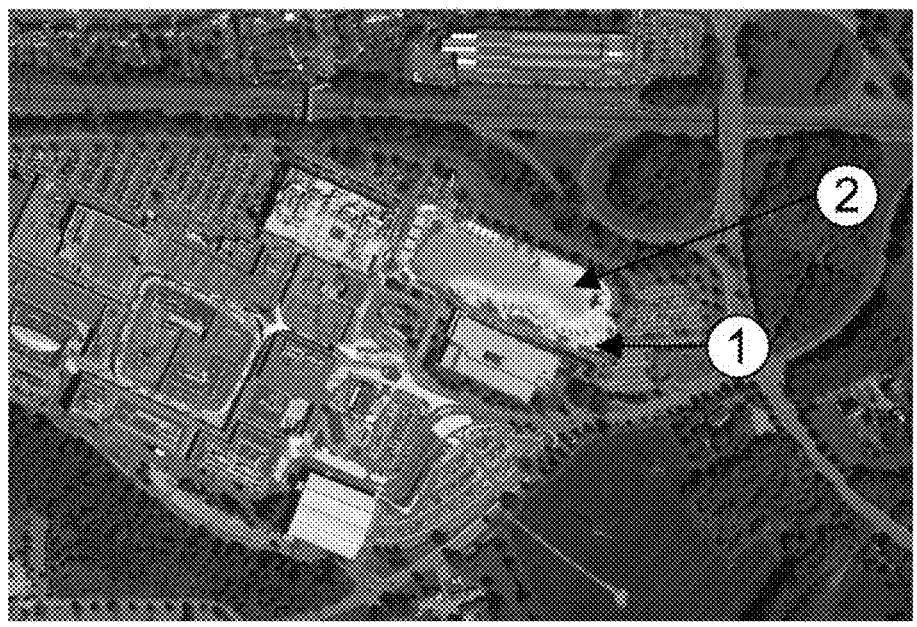

A few prophetic embodiments of how some aforementioned venues can be efficiently utilized with the present invention are shown in FIGS. 12A, 12B, 13A, 13B, 14A, and 14B. FIGS. 12A and 12B depict one embodiment of the present invention, where a horse race track which has a large underutilized area inside the track 21a. The underutilized area shown in FIG. 12A is transformed as shown in FIG. 12B into a beautiful area with a centerpiece tropical-style pristine-clear lagoon 2, creating an urban beach entertainment complex 1. FIGS. 13A, 13B and 14A, 14B depict another embodiment of the present invention, where a portion of parking lots 21b shown in FIGS. 13A and 14A are converted into an urban beach entertainment complex in FIGS. 13B and 14B having a centerpiece tropical-style pristine-clear lagoon 2.

It will be appreciated that access infrastructure, such as roads and public transportation, must be in place to transport visitors to the complexes (i.e., in order to be able to reach the complex at reasonable costs and within a reasonable amount of time).

Additionally, the site can preferably have a predefined water source and sufficient availability for use. The type of water may be fresh, brackish, saline, or seawater, depending on availability. Sources of water may be selected from the group comprising the sea, groundwater, potable water, surface water, wells, or others.

The water source should not be contaminated with industrial residuals that require an extensive industrial pre-treatment and that cannot be removed with simple and conventional pre-treatment methods such as oxidation or filtration processes. For example, the water source must preferably not be contaminated with industrial water residues such as Aluminum and hydrocarbons. Extensive industrial pre-treatment systems usually require the use of large sedimentation basins that also create an industrial appearance—which conflicts with the tropical beach sensation that is an objective of the present invention.

Once the site has been selected, the method creates the development of a publicly accessible urban beach entertainment complex 1 with a large man-made tropical, pristine-clear lagoon 2 as it centerpiece. The lagoon 2 preferably has the look and feel of tropical seas and beaches thereby creating an idyllic beach sensation. The tropical look and feel ambiance refers to providing a feeling of being in an idyllic setting, with a large water body and beach area, simulating, for example, the sensation of being in the Caribbean.

The publicly accessible urban beach entertainment complex comprises a low-cost treatment system that provides a water treatment technology that uses at least 50% less electricity compared to a conventional swimming pool centralized filtration systems. The water treatment technology comprises a filtration system that has a capacity and filtration water volume that is at least 50% smaller than that of conventional swimming pool filtration systems (e.g., that filter the complete water volume 4 times per day). Further, in an embodiment of the invention, the water treatment technology for operating the centerpiece tropical-style lagoon must use at least 50% less chemicals than a conventional swimming pool disinfection system (e.g., that requires maintaining at least 1 ppm of chlorine permanently throughout the water volume). Therefore, the lagoon 2 presents less chemical smell than a conventional pool.

The urban beach entertainment complexes may, for example, be located in public parks. However, a physical barrier and/or enclosure must exist to have a controlled public access into the urban beach entertainment complex 1 or to a portion of it, such as a control system and access control locations 13.

Additionally, in order for the efficient use of the limited use site, facility or land, the method comprises charging an entry fee to allow access to at least a portion of the urban beach entertainment complex. Such fee can be charged previously to visiting the urban beach entertainment complex, or it can be charged on site based on availability and other factors, such as demand, and total occupation rates, among others. The fees can be variable depending on age, number of people within groups, seasonality, or others. In addition, fees may be based on different season, monthly, weekly, or other passes. It will also be appreciated that electronic ticketing using cell phones and other devices may be used in addition to printed materials and/or cards. It is appreciated that there may also be seasonal passes (such as weekly, monthly, or yearly passes) that may be purchased online or previous to visiting the urban beach entertainment complex.

In an embodiment of the invention, the centerpiece lagoon and surrounding facilities can be accessed publicly only after payment of an entry fee collected prior to entry. However, in some embodiments, it may desirable for at least a portion of the entertainment, cafes, and restaurant areas to be available to guests without payment of a fee. In those embodiments, users of the beach and water sports areas may be charged a fee for access to those areas.

Therefore, the method includes the opportunity to generate revenue for sites that have been underutilized or that have no current use such as vacant land, limited use land, and land that is contiguous or nearby venues such as recreational, educational, sports, and commercial venues, by creating a novel beach entertainment complex with a large tropical, pristine-clear lagoon as its centerpiece, and where there is controlled access and where a ticket/fee is charged to enter the site.

Based on the population within a 50-mile radius, and the amount of demand that the urban beach recreation complex will create, it is expected that a minimum of 100,000 annual visitors will access the tropical-style setting, preferably 500,000 annual visitors, and a most preferred over 1,000,000 visitors per year. Visitors are anticipated and targeted to be mainly from the surrounding population and are expected to repeat their visit to the urban beach entertainment complex many times. Due to the beautiful and recreational nature of these beach-like settings that allow relaxing, shopping, practicing water sports, swimming, eating, among other activities, it is expected that annual attendance will be massive, aiming for a large percentage of nearby population, and also an additional percentage of tourists that will attend the publicly accessible urban beach recreational complexes.

It has been calculated that by creating a complex, utilizing the principles of the present invention, the number of visitors to such an urban beach entertainment complex may achieve attendance on the order of 100,000 to 1,000,000 and up to 6,000,000 visitors per year. Based on the market and socio-economic status of the cities, the entry fees are expected to be in the range of USD$5 to USD$150, preferably in the range of USD$10 to USD$20, rendering a direct yearly income of USD$1,000,000 to USD$120,000,000 only based on access tickets.

Therefore, for example, an urban beach recreational center with a tropical-style centerpiece lagoon of 16,000 m² in size, with a yearly visitor number of 500,000 persons, and an entry fee of US$15 could generate US$7,500,000 in direct revenue from tickets, where the total construction cost of the centerpiece lagoon would be in the order of US$2,400,000 and annual operating costs would be less than $100,000 USD per year (considering chemicals and electricity).

V. Shopping Mall Example

As another prophetic example, it must be noted that the method of the present invention can be used in the shopping mall industry, wherein a portion of the parking lots located in currently underutilized shopping mall space can be transformed into an urban beach entertainment complex. Three scenarios are derived from a project evaluation, including a conservative scenario, a base case scenario, and an upside scenario, wherein revenues and profits associated with installation, operation and entry-fee based access of the urban beach entertainment complex are as follows in Table 3.

TABLE 3

| Description | Conservative | Base Case | Upside |
|---|---|---|---|
| Attendance | 250,000 persons per year | 500,000 persons per year | 750,000 persons per year |
| Entry Ticket | US$30 | US$30 | US$30 |
| Gross Revenue Years 1-4 | US$30,000,000 | US$60,000,000 | US$90,000,000 |
| Internal Rate of Return | 67.3% | 129.8% | 172.1% |
| Return on Cost | 32% | 68% | 105% |

The scenarios set forth in Table 3 do not consider an event center, large restaurant areas, or sports venues, but does consider ancillaries such as a beach center with rentals. Therefore, return rates are expected to reach significant levels, thereby creating a very attractive market and investment by enhancing the efficiency of limited use land—in this case, the parking lot of a current shopping mall.

It is important to note that around the world some locations have been modified by for example adding sand on the border of natural rivers having poor water quality. With only this improvement, more than 500,000 people have visited every year. Examples of such places include Lujan Beach in Mendoza, Argentina and Encarnacion in Paraguay. But neither of the two examples of public access locations have created a meeting point of the 21$^{st}$ century, where an urban beach entertainment complex with a centerpiece tropical-style pristine-clear lagoon is provided with ancillary facilities and wherein there are beach centers, rentals, stages, and similar facilities and amenities to enjoy the day and night with family and friends. Also, it is not believed that such locations have as great an opportunity for profitability as in the present invention's method, which based on calculations and economic evaluations have yield an internal return rate of up to 172% and even more, depending on a specific scenario. The ability of cost-efficiently transforming limited use land such as underutilized sites or facilities, that are contiguous or nearby recreational, educational, sports, or commercial venues into a highly profitable business by creating an urban beach entertainment complex has never been seen before, and will have great social and economic benefits.

The urban beach entertainment complex and method for providing efficient utilization of limited use land from the present invention also considers including entertainment and commercial amenities into the urban beach entertainment complex, through rental or facilitation of space, facilities, services such as food and drinks, activities, or equipment. Therefore, based on studies it is expected that the previously calculated income from direct access fees can even double through such ancillary businesses.

Some amenities surrounding the centerpiece tropical-style pristine-clear lagoon comprise:
  Natural and beachfront amphitheaters with stages and spaces for concerts, e-sports, and others.
  Large screens for showcasing movies, sport events, conferences, educational activities, live events, exclusive streaming of shows and other events, and others.

Unique waterfront event centers and venues for conferences, weddings, tradeshows, fairs, meetings, and others.

Food and drink sectors with permanent or temporal facilities such as bars, restaurants, food trucks, coffee shops, and others.

Sport sectors such as gyms, running trails, soccer fields, tennis fields, and others.

Shopping centers and facilities.

Kiosks

Rental Centers for coordinating activities or renting equipment.

Figure 1B:
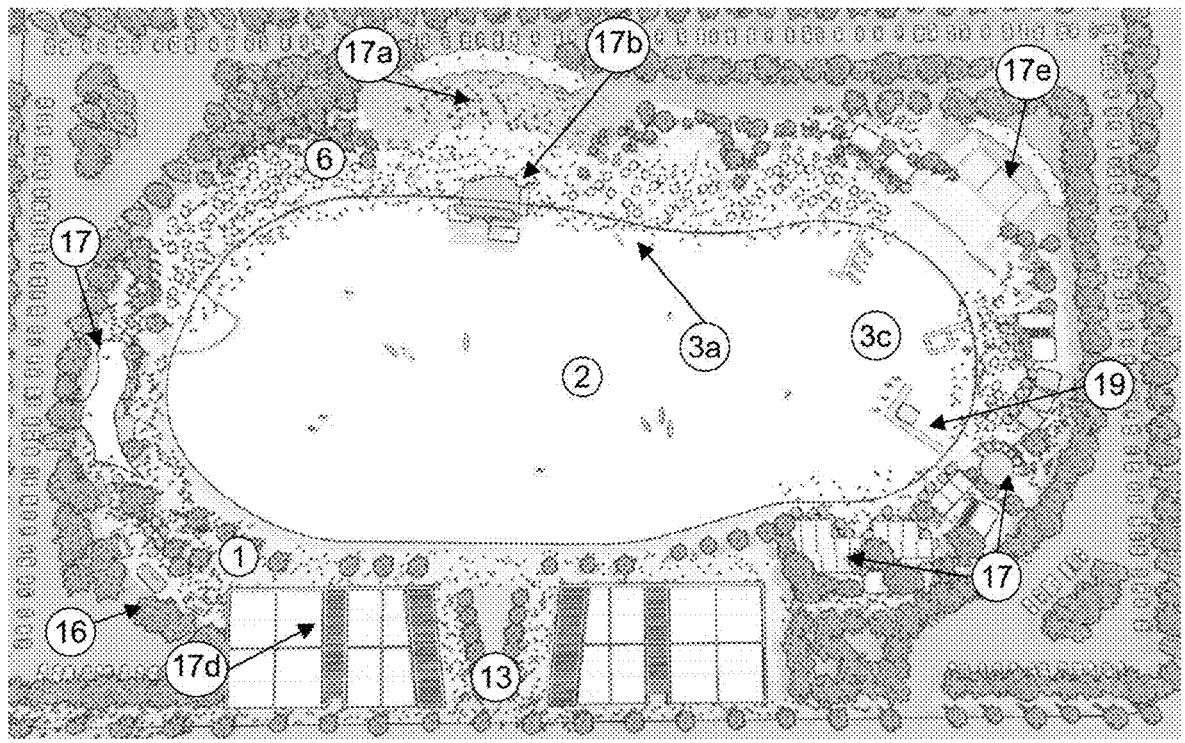

An amphitheater section 17a may also be created within the urban beach entertainment complex, wherein the amphitheaters 17a can house a large screen 17b and/or stage 17c in order to house different activities (See FIGS. 1A and 1B).

Additional activities to be performed using the large tropical-style pristine-clear lagoon directly or indirectly are: Floating water parks comprising Wibit® or Aquaglide® facilities, Banana boating, Holographic light displays, Water shows, Floating stages, among others.

The different activities and shows can be performed live on site or can be showcased and/or streamed through a large screen configured to be able to be seen by a predetermined number of people. Such activities and shows comprise concerts, shows such as waterskiing shows, drone light shows, aqua-climb shows, synchronized swimming, ceremonies, movies, TV Series, documentaries, sports comprising beach volleyball, e-sports, games and gaming activities, competitions comprising drone racing, streaming of live or pre-recorded material, among others.

The beach entertainment complexes can be mostly outdoor, or can be fully or partially covered with domes or structures that allow year-round uses and activities in locations with strong seasonality, and that allow creating winter events inside the domes. Such domes can be structural or inflatable, and can be arranged and configured to over the complete tropical-style lagoon or a portion thereof.

Additional amenities that are configured within the beach entertainment complex comprise beach cabanas, bars, retail, waterfront or beachfront terraces, restaurants, food trucks, picnic and BBQ areas.

In an embodiment of the invention, the centerpiece pristine-clear lagoon 2 is heated through an external heating system partially or completely using the waste heat from an industrial process. For example, the pristine-clear lagoon may be heated indirectly using a heat exchanger that exchanges hot water from the cooling stage of an industrial or commercial process with water from the pristine lagoon. The water heating may be performed through a heating system (not shown) such as a heat exchanger that indirectly transfers the heat from the industrial or commercial process' cooling stage into the lagoon's water.

In another embodiment of the invention, the bathing zone of the tropical-style man-made lagoon is heated through a heating system that allows providing heating to the zero-entry beach edge of the lagoon to provide higher temperature to the water in the bathing area.

In another embodiment of the invention, the make-up water is returned into the bathing zones to control the temperature of the water in such bathing zone, especially in hot weather locations where generally the make-up water will be colder than the water in the centerpiece lagoon, and therefore such make-up water helps cool down such zone.

Additional equipment can be included in the perimeter or within the centerpiece lagoon in order to generate surface textures and movement of the water in the form of aesthetic waves, wherein the aesthetic waves do not have an amplitude of more than 50 cm in most of the lagoon.

VI. Alternative Embodiments

FIGS. 1A and 1B, and FIGS. 4A, 4B, 5A, 5B, 6A, 6B, 7A and 7B show a plan or aerial view of a schematic configuration of a first embodiment of the urban beach entertainment complex 1, wherein the complete urban beach entertainment complex 1 is physically enclosed through a physical barrier 16 that allows having at least one access control location 13 which allows access to the urban beach entertainment complex 1. The centerpiece pristine-clear lagoon 2 has at least one zero-entry beach edge 3a and a sand beach area 6 surrounding at least one portion of the centerpiece lagoon. Amphitheaters 17a can also be included in the urban beach entertainment complex, facing the centerpiece pristine-clear lagoon 2, that are able to house different entertainment events, and which can also include a large screen 17b. The urban beach entertainment complex also comprises different recreational, educational, commercial venues and facilities 17 such as an event center 17d, which can be temporal or permanent installations.

FIG. 6 shows an aerial view of a schematic configuration of an embodiment of the urban beach entertainment complex 1 corresponding to a mixed use, wherein a portion of the urban beach entertainment complex 1 is physically enclosed through a physical barrier 16 that allows having at least one access control location 16, which allows access to the urban beach entertainment complex 1. A portion of the centerpiece tropical-style lagoon 2 is accessed through a control system 14, wherein other portions are accessed by residents or allowed visitors of a residential project 22. The urban beach entertainment complex also comprises different recreational, educational, commercial venues and facilities 17, which can be temporal or permanent installations.

While the invention has been particularly shown and described with reference to preferred embodiments thereof, it will be understood by those skilled in the art that various other changes in the form and details may be made therein without departing form the spirit and scope of the invention

What is claimed is:

1. A publicly accessible urban beach entertainment complex, for bringing an idyllic beach life to urban locations, and to transform retail markets, event centers and arenas, cultural facilities, stadiums, golf courses, zoos, university campuses, speed tracks, horse race tracks, Olympic venues, and other recreational, educational, sports, and commercial venues, underutilized sites, limited use sites, and vacant sites, the complex comprising:

a. a physical site in an urban area, the physical site having a minimum total surface of 16,000 m2 with a surrounding population of at least 200,000 people within a 30-mile radius and where the site targets the surrounding population connected by road access;

b. a large centerpiece lagoon, the lagoon having a bottom, a perimeter, and a minimum surface area of 8,000 m$^2$ to recreate a tropical lifestyle look and feel, and wherein a majority of the bottom in the water sports zone includes a plastic material, and wherein the lagoon further includes:

i. at least one bathing zone within the lagoon, the bathing zone having a zero-entry edge at the perimeter, wherein the bathing zone comprises a localized disinfection system, whereby an increased chemical concentration is provided in the bathing zone;

ii. at least one water sports zone located within the lagoon, the water sports zone comprising a water depth of at least 1.8 meters at its deepest point;
c. at least one sand beach area and a rest area surrounding the perimeter of the lagoon, wherein the sand of the sand beach area has a light color thereby resembling a tropical beach, and wherein the sand beach areas and rest areas have a surface area of at least 2500 m2;
d. a water supply system, operatively connected to a water supply, for providing filling or make-up water for the lagoon;
e. a water treatment system arranged and configured to:
collect water from the water supply system and store such water in the lagoon having a bottom able to be cleaned by a mobile suction device;
during a seven-day interval, treat the water in the lagoon by periodically adding disinfectant agents to the water to establish an ORP of at least 500 mV for a period of time dependent on the temperature of the water being treated; and
activate the operation of the mobile suction device in order to suction a portion of the water in the lagoon containing settled solids to prevent the thickness of settled materials from exceeding three mm, and filtering such portion of the water suctioned by the mobile suction device and returning the filtered water to the water in the lagoon;
whereby the water treatment system utilizes at least 50% less electricity compared to a conventional swimming pool centralized filtration system and the filtration capacity and filtration water volume is at least 50% lower than for a conventional swimming pool filtration system that filters the complete water volume four times per day;
f. a low-cost reduced centralized filtration system that filters a volume of water of lagoon, wherein the low-cost reduced centralized filtration system comprises at least one of a lower total number of bottom inlets and/or a lower filtration rate to achieve a Filtration Efficiency Index (FEI) of less than 80% of the Swimming Pool Filtration Index (SPFI), wherein the Filtration Efficiency Index (FEI) and the Swimming Pool Filtration Index (SPFI) are defined as:

$$\text{Filtration Efficiency Index } (FEI) = 100 \times \frac{\#BI \times TRR}{Ws}$$

$$\text{Swimming Pool Filtration Index } (SPFI) = 100 \times \frac{\#BI_{FL} \times TRR_{FL}}{Ws}$$

$$FEI \leq 0{,}8 \times SPFI$$

Where:
BI is the total number of bottom inlets found in the centerpiece lagoon
$\#BI_{FL}$ is the total number of bottom inlets of a conventionally designed swimming pool according to Florida Swimming Pool Regulations for the same dimensions of the centerpiece lagoon
TRR is the theoretical filtration rate which is calculated as the theoretical numeric calculation for the number of times the total volume of water is recirculated and filtered through the low-cost reduced centralized filtration system of the lagoon per day
$TRR_{FL}$ is the theoretical filtration rate from Florida Swimming Pool Regulations
Ws is the water surface of the centerpiece lagoon in square feet
g. a dual-frequency skimmer system, comprising:
a high-frequency reduced skimmer system (HFSS) that periodically removes surface water from the lagoon, and the removed water being directed into a low-cost reduced centralized filtration system, wherein the high-frequency reduced skimmer system HFSS is operated for at least 20% of the time that the lagoon is open for direct contact recreational purposes;
a low-frequency skimmer system (LFSS) that removes surface water from the lagoon during a high-renewal event or rain events, wherein the LFSS comprises at least one discharge weir structure that is located within a section of the perimeter of the lagoon;
wherein the dual-frequency skimmer system has a Skimmer Operation Rate (SOR) of at least 10, wherein the SOR denotes a ratio of operative hours of the HFSS (41) to the operative hours of the LFSS (42) within a 30-day period of time, as seen below:

$$\text{Skimmer Operation Rate } (SOR) = \frac{\text{Hours of Operation of } HFSS}{\text{Hours of Operation of } LFSS} \geq 10$$

h. a micro-renewal system that operates permanently, which allows a micro-leakage of the water through a plurality of micro-leakage points located in an inner bottom surface of the lagoon, wherein:
a total micro-leakage volume is defined as the total volume of water removed from the lagoon through the micro-leakage points and is lower than the volume of water filtered by the reduced low-cost centralized filtration system,
the plurality of micro-leakage points are distributed throughout the inner bottom surface of the lagoon that is in contact with a soil or a filling material under the lagoon, and
a minimum micro-leakage water flow is established, so that at least 10% of the lagoon's water volume is lost through micro-leakage annually;
i. a physical barrier surrounding at least a portion of the physical site, the barrier being arranged and configured to limit individual access to the complex or its centerpiece lagoon;
j. an access control system wherein the access control system is arranged and configured to selectively permit entry of individuals into at least a portion of the urban beach entertainment complex; and
k. at least one ancillary facility located within the complex, selected from the group of commercial, recreational, educational, cultural, residential, and sports facilities in order to allow different events and activities to be held within the complex.

2. The publicly accessible urban beach entertainment complex of claim 1, wherein a majority of the bottom of the lagoon in the water sports zone includes a plastic material.

3. The publicly accessible urban beach entertainment complex of claim 2, wherein at least 80% of bottom of the lagoon in the water sports zone is constructed with the plastic material.

4. The publicly accessible urban beach entertainment complex of claim 2, wherein the plastic material is selected from the group comprising polyvinyl chloride, polyethylene, rubbers, and polypropylene.

5. The publicly accessible urban beach entertainment complex of claim 2, wherein the color of the plastic material is white, light blue or light brown.

6. The publicly accessible urban beach entertainment complex of claim 1, wherein the bottom is constructed with materials to provide layers, comprising plastic liners, shotcrete, and mineral layers, the materials forming the bottom help to achieve lower costs than conventional swimming pools having a concrete bottom.

7. The publicly accessible urban beach entertainment complex of claim 1, wherein the bottom includes at least one of a plastic liner, shotcrete, and a mineral layer as a bottom material.

8. The publicly accessible urban beach entertainment complex of claim 1, wherein the bottom is constructed to include two or more of the bottom materials in layers.

9. The publicly accessible urban beach entertainment complex of claim 1, wherein the color of the sand in the sand beach area is selected from the following colors according to the RAL color scale: RAL 9001, RAL 9002, RAL 9003, RAL 9010, RAL 9016, RAL 9018, RAL 1001, RAL 1014, or RAL 1004.

10. The publicly accessible urban beach entertainment complex of claim 1, wherein the bathing zone comprises a zero-entry edge having a slope between 5% and 30%, whereby the slope resembles a natural beach edge with a soft slope.

11. The publicly accessible urban beach entertainment complex of claim 1, further comprising a localized disinfection system in the bathing zone whereby an increased chemical concentration is provided in the bathing zone, the localized disinfection system including a dispensing outlet arranged and configured to apply disinfecting chemicals to the water volume within the bathing zone.

12. The publicly accessible urban beach entertainment complex of claim 11, wherein the localized disinfection system includes devices selected from the group comprising nozzles, injectors, jets, piping, and outlets.

13. The publicly accessible urban beach entertainment complex of claim 11, wherein the localized disinfection system is located at the perimeter of the lagoon and generally bounded by the swimming zone, whereby the primary influence of the disinfecting chemicals is mainly within the swimming zone.

14. The publicly accessible urban beach entertainment complex of claim 1, wherein the localized disinfection system includes a plurality of dispensing outlets, with the dispensing outlets being located at the bottom of the lagoon within the swimming zone, whereby the primary influence of the disinfecting chemicals is mainly within the swimming zone.

15. The publicly accessible urban beach entertainment complex of claim 1, wherein the bottom of the lagoon in water sports zone includes a variety of different slopes and depths.

16. The publicly accessible urban beach entertainment complex of claim 1, wherein the water sports zone is arranged and configured mainly for small watercraft to operate within the water sports zone, and wherein the water sports to be practiced in the water sports zone are selected from the group comprising: sailing, boating, canoeing, rowing, kayaking, water skiing, flyboarding, paddleboarding, parasailing, wakeboarding, windsurfing, kiteboarding, and kitesurfing.

17. The publicly accessible urban beach entertainment complex of claim 1, wherein the perimeter of the lagoon includes curved shapes and round corners, whereby the lagoon resembles a natural water body.

18. The publicly accessible urban beach entertainment complex of claim 1, further including tropical vegetation located in the sand beach area and additional rest areas, whereby a tropical setting is created.

19. The publicly accessible urban beach entertainment complex of claim 1, wherein the surface area of the lagoon is in the range of 8,000 m2 to 200,000 m2.

20. The publicly accessible urban beach entertainment complex of claim 1, wherein the water supply system is arranged and configured to maintain a water volume in the lagoon of at least 80% of the designed water volume permanently.

21. The publicly accessible urban beach entertainment complex of claim 1, wherein the water supply system includes devices selected from the group comprising: piping, nozzles, waterfalls, inlets, outlets, and valves.

22. The publicly accessible urban beach entertainment complex of claim 1, wherein the make-up water has iron and manganese concentrations of up to 2 ppm and turbidity of up to 8 NTU.

23. The publicly accessible urban beach entertainment complex of claim 1, wherein the water treatment system includes a modular treatment system and wherein the modular treatment system includes elements selected from the group comprising: containerized machine rooms, skid mounted systems, and water treatment equipment.

24. The publicly accessible urban beach entertainment complex of claim 23, wherein the modular treatment system has a plug and play configuration.

25. The publicly accessible urban beach entertainment complex of claim 1, wherein the access control system is located in at least a portion of the physical barrier.

26. The publicly accessible urban beach entertainment complex of claim 1, wherein the access control system is located anywhere within the premises of the complex.

27. The publicly accessible urban beach entertainment complex of claim 1, wherein the access control system is configured to permit entry of individuals into at least a portion of the urban beach entertainment complex based on information received by a ticket, an entry fee, a seasonal pass, though membership, by association to an admissions program, as guests of the ancillary facilities, through electronic ticketing, electronic ticketing using cell phone and other devices, a printed material, a card, among others.

28. The publicly accessible urban beach entertainment complex of claim 1, wherein the ancillary facilities include event arenas, museums, amusement parks, water parks, stadiums, golf courses, membership clubs, temporary accommodation facilities such as hotels, zoos, aquariums, shopping centers, university campuses, casinos, cruise ship ports, speed tracks, horse race tracks, and Olympic venues, among others.

29. The publicly accessible urban beach entertainment complex of claim 1, wherein the water treatment system is arranged and configured to utilize at least 50% less chemicals than a conventional swimming pool disinfection system that requires maintaining at least 1 ppm of chlorine permanently in all of the water volume.

30. The publicly accessible urban beach entertainment complex of claim 1, wherein the lagoon is arranged and configured to create a fetch length, when exposed to the wind, due to the size and length of the lagoon, whereby a natural wave motion is created on the surface of the lagoon which is similar to that of natural lakes.

31. The publicly accessible urban beach entertainment complex of claim 1, wherein the lagoon operates in an essentially closed cycle, whereby the water in the lagoon is not significantly renewed from an open body of water.

32. The publicly accessible urban beach entertainment complex of claim 1, wherein the water in the lagoon has a minimum vertical transparency of 1.2 meters, whereby the lagoon water transparency resembles the pristine clear waters of tropical seas.

33. The publicly accessible urban beach entertainment complex of claim 1, wherein evaporation control chemicals are added to the water of the lagoon, whereby evaporation is reduced up to 50% compared to natural evaporation rates.

34. The publicly accessible urban beach entertainment complex of claim 1, wherein the access control system includes at least one location in the physical barrier.

35. The publicly accessible urban beach entertainment complex of claim 34, wherein the access control location includes a control system, wherein the control system is selected from the group comprising gated entries, turnstiles, access readers, security barriers, biometric systems.

36. The publicly accessible urban beach entertainment complex of claim 1, wherein the physical barrier includes at least one element selected from the group comprising: fences, walls, moats, natural vegetation, and buildings.

37. The publicly accessible urban beach entertainment complex of claim 1, wherein the access control system is arranged and configured to allow access to at least 500 people per hour into the urban beach entertainment complex.

38. The publicly accessible urban beach entertainment complex of claim 1, further comprising at least one ancillary facility selected from the group comprising amphitheaters having a stage, event centers, kiosks, rental centers, shopping centers, gyms, promenades, sports fields, restaurants, bars, and coffee shops.

39. The publicly accessible urban beach entertainment complex of claim 1, further comprising at least one beachfront amphitheater having a stage for hosting and/or showcasing different events, educational activities, concerts, cultural activities, sport events, and similar content.

40. The publicly accessible urban beach entertainment complex of claim 1, further comprising at least one large screen on which to project a video image, whereby movies, e-sports, sport events, conferences, simulcasts, live streaming of content, and educational activities, events, may be shown.

41. The publicly accessible urban beach entertainment complex of claim 1, wherein the lagoon includes an illumination system, whereby use of the lagoon is facilitated during low light hours or under enclosed structures.

42. The publicly accessible urban beach entertainment complex of claim 41, wherein the illumination system comprises lights located about the periphery and beneath the surface of the water in the lagoon.

43. The publicly accessible urban beach entertainment complex of claim 1, wherein the lagoon includes at least one dock extending from the periphery of the lagoon toward a deeper portion of the lagoon, whereby access to the deeper portions is facilitated and enables the practice of aquatic sports.

44. The publicly accessible urban beach entertainment complex of claim 1, wherein at least a portion of the entertainment complex is covered with a dome.

45. The publicly accessible urban beach entertainment complex of claim 44, wherein the dome is selected from the group comprising structural or inflatable domes.

46. The publicly accessible urban beach entertainment complex of claim 1, further comprising a heating system, wherein at least some of the water in the lagoon is heated.

47. The publicly accessible urban beach entertainment complex of claim 46, wherein the heating system uses at least part of the waste heat from an industrial or commercial cooling process.

48. The publicly accessible urban beach entertainment complex of claim 46, wherein the heating system is arranged and configured to increase the water temperature in the bathing zone.

49. The publicly accessible urban beach entertainment complex of claim 1, further comprising returning the make-up water into the bathing zone to control the temperature of the water in the bathing zone.

50. The publicly accessible urban beach entertainment complex of claim 1, wherein additional equipment is included in the perimeter of the lagoon to generate surface textures and movement of the water in the form of small, aesthetic waves.

51. The publicly accessible urban beach entertainment complex of claim 50, wherein the aesthetic waves do not have an amplitude of more than 50 cm.

52. A method for efficiently utilizing limited use land by creating a publicly accessible urban beach entertainment complex, the method comprising:
   a. selecting a site with a minimum total surface of 16,000 m2, wherein the site is selected from vacant land, underutilized sites, limited use land, or land that is contiguous or nearby recreational, educational, sports, or commercial venues, has a minimum surrounding population of 500.000 people within a 50-mile radius connected by road access, and has a water supply with sufficient availability for use at the site;
   b. constructing a centerpiece lagoon, the lagoon having a bottom, a perimeter, and a surface area between 8,000 m2 and 200,000 m2 to recreate a tropical lifestyle look and feel,
   c. establishing at least one sand beach area and a rest area surrounding the perimeter of the lagoon, wherein the sand of the sand beach area has a light color thereby resembling a tropical beach;
   d. connecting a water source to the lagoon with a water supply system, the water supply system providing both filling and/or make-up water for the lagoon;
   e. incorporate a water treatment system arranged and configured to:
     collect water from the water supply system and store such water in the lagoon having a bottom able to be cleaned by a mobile suction device;
     during a seven-day interval, treat the water in the lagoon by periodically adding
     disinfectant agents to the water to establish an ORP of at least 500 mV for a period of time dependent on the temperature of the water being treated; and
     activate the operation of the mobile suction device in order to suction a portion of the water in the lagoon containing settled solids to prevent the thickness of settled materials from exceeding three mm, and filtering such portion of the water suctioned by the mobile suction device and returning the filtered water to the water in the lagoon;
     whereby the water treatment system utilizes at least 50% less electricity compared to a conventional swimming pool centralized filtration system and the filtration capacity and filtration water volume is at least 50% lower than for a conventional swimming pool filtration system that filters the complete water volume four times per day;

f. incorporate a low-cost reduced centralized filtration system that filters a volume of water of lagoon, wherein the low-cost reduced centralized filtration system comprises at least one of a lower total number of bottom inlets and/or a lower filtration rate to achieve a Filtration Efficiency Index (FEI) of less than 80% of the Swimming Pool Filtration Index (SPFI), wherein the Filtration Efficiency Index (FEI) and the Swimming Pool Filtration Index (SPFI) are defined as:

$$\text{Filtration Efficiency Index } (FEI) = 100 \times \frac{\#BI \times TRR}{Ws}$$

$$\text{Swimming Pool Filtration Index } (SPFI) = 100 \times \frac{\#BI_{FL} \times TRR_{FL}}{Ws}$$

$$FEI \leq 0.8 \times SPFI$$

Where:
BI is the total number of bottom inlets found in the centerpiece lagoon
$\#BI_{FL}$ is the total number of bottom inlets of a conventionally designed swimming pool according to Florida Swimming Pool Regulations for the same dimensions of the centerpiece lagoon
TRR is the theoretical filtration rate which is calculated as the theoretical numeric calculation for the number of times the total volume of water is recirculated and filtered through the low-cost reduced centralized filtration system of the lagoon per day
$TRR_{FL}$ is the theoretical filtration rate from Florida Swimming Pool Regulations
Ws is the water surface of the centerpiece lagoon in square feet g. Incorporate a dual-frequency skimmer system, comprising:
a high-frequency reduced skimmer system (HFSS) that periodically removes surface water from the lagoon, and the removed water being directed into a low-cost reduced centralized filtration system, wherein the high-frequency reduced skimmer system HFSS is operated for at least 20% of the time that the lagoon is open for direct contact recreational purposes;
a low-frequency skimmer system (LFSS) that removes surface water from the lagoon during a high-renewal event or rain events, wherein the LFSS comprises at least one discharge weir structure that is located within a section of the perimeter of the lagoon;
wherein the dual-frequency skimmer system has a Skimmer Operation Rate (SOR) of at least 10, wherein the SOR denotes a ratio of operative hours of the HFSS (41) to the operative hours of the LFSS (42) within a 30-day period of time, as seen below:

$$\text{Skimmer Operation Rate } (SOR) = \frac{\text{Hours of Operation of } HFSS}{\text{Hours of Operation of } LFSS} \geq 10$$

h. incorporate a micro-renewal system that operates permanently, which allows a micro-leakage of the water through a plurality of micro-leakage points located in an inner bottom surface of the lagoon, wherein:
a total micro-leakage volume is defined as the total volume of water removed from the lagoon through the micro-leakage points and is lower than the volume of water filtered by the reduced low-cost centralized filtration system,
the plurality of micro-leakage points are distributed throughout the inner bottom surface of the lagoon that is in contact with a soil or a filling material under the lagoon, and
a minimum micro-leakage water flow is established, so that at least 10% of the lagoon's water volume is lost through micro-leakage annually;

i. incorporate a physical barrier surrounding at least a portion of the physical site, the barrier being arranged and configured to limit individual access to the complex or its centerpiece lagoon;

j. delimiting at least a portion of the publicly accessible urban beach entertainment complex with a physical barrier, the barrier being arranged and configured to limit individual access to the complex;

k. establishing at least one ancillary facility located within the entertainment area, selected from the group of commercial, recreational, educational, cultural, residential, sports and temporary accommodation facilities;

l. establishing an access control system, wherein the access control system is arranged and configured to selectively permit entry of individuals into at least a portion of the urban beach entertainment complex; and whereby individual entry fees provide revenue for the urban beach entertainment complex, thereby providing an efficient use of a facility or land that has limited use.

53. The method of claim 52, further comprising creating at least one water sports zone within the lagoon, and wherein the water sports zone has a minimum water depth of at least 1.8 meters at its deepest point.

54. The method of claim 52, wherein the type of water used from the water source is selected from the group comprising: fresh water, brackish water, saline water or seawater.

55. The method of claim 52, wherein the water source does not include aluminum or hydrocarbons, whereby pretreatment of the water is minimized.

56. The method of claim 52, further comprising covering at least 80% of the bottom of the lagoon in the water sports zone with a flexible plastic material.

57. The method of claim 56, wherein the plastic material is a light-colored membrane, whereby in combination with the minimum depth the characteristic and intense color of tropical seas is generated.

58. The method of claim 56, wherein the color of the plastic material ranges from white to a light blue or light brown color.

59. The method of claim 52, wherein the color of the sand is selected from the following colors according to the RAL color scale: RAL 9001, RAL 9002, RAL 9003, RAL 9010, RAL 9016, RAL 9018, RAL 1001, RAL 1014, and RAL 1004.

60. The method of claim 56, wherein the plastic material is selected from the group comprising polyvinyl chloride, polyethylene, rubbers, and polypropylene.

61. The method of claim 52, further including forming the edges of the lagoon with curved shapes with round corners, whereby the lagoon resembles a natural water body.

62. The method of claim 52, wherein the lagoon comprises a zero-entry edge having a slope between 5% and 30%, whereby the slope resembles a natural beach edge with a soft slope.

63. The method of claim 52, further including placing tropical vegetation in the urban beach entertainment complex.

64. The method of claim 62, wherein the tropical vegetation includes trees and plants and are located in and adjacent to the sand beach area.

65. The method of claim 52, further providing a modular treatment system for water treatment to the water contained in the lagoon and wherein the modular treatment system has a plug and play configuration.

66. The method according to claim 52, further comprising designing the length and size of the lagoon such that, when the lagoon is subject to wind, establishes a fetch length, whereby the established fetch length encourages a natural surface wave motion similar to that of natural bodies of water.

67. The method of claim 52, further comprising operating the lagoon in an essentially closed cycle manner, wherein the water volume is not significantly renewed through recirculation with the water source.

68. The method of claim 52, further comprising maintaining the water in the lagoon such that a minimum vertical transparency of 1.2 meters is established, whereby the water in the lagoon resembles the clear water of tropical seas.

69. The method of claim 52, further comprising adding evaporation control chemicals to the water in the lagoon, whereby evaporation is reduced compared to natural evaporation rates.

70. The method of claim 52, further comprising locating at least one access control system in the physical barrier.

71. The method of claim 70, wherein the access control location includes a control system selected from the group comprising gated entries, turnstiles, access readers, security barriers, or biometric systems.

72. The method of claim 70, further comprising locating the access control system relative to the physical barrier such that access to at least a predetermined portion of the urban beach entertainment complex is controlled.

73. The method of claim 52, wherein the physical barrier comprises one or more elements selected from the group comprising fences, walls, moats, natural vegetation, and buildings.

74. The method of claim 52, wherein the access control system is configured to allow access to at least 500 people per hour into the urban beach entertainment complex.

75. The method of claim 52, further comprising locating an amphitheater having a stage within the urban beach entertainment complex, whereby events, educational activities, concerts, cultural activities, and sporting events may be conducted.

76. The method of claim 52, further comprising locating a video screen in the urban beach entertainment complex for showing movies, sporting events, conferences, simulcasts, live streaming of content, and educational activities.

77. The method of claim 52, further comprising an illumination system for the lagoon.

78. The method of claim 77, wherein the illumination system comprises LED underwater strip lights or underwater spot lights.

79. The method of claim 52, further comprising constructing a dock in the lagoon, the dock extending from a perimeter of the lagoon toward a deeper portion of the lagoon, whereby the dock enables access to the deeper portion to better enable practicing water sports.

80. The method of claim 52, further comprising a dome over at least a portion of the urban beach entertainment complex.

81. The method of claim 80, wherein the dome is selected from structural or inflatable domes and is arranged and configured to be located over at least a portion of the lagoon.

82. The method of claim 52, further comprising installing an external heating system to heat water in the lagoon.

83. The method of claim 82, wherein the external heating system uses, at least partially, waste heat from an industrial or commercial cooling process.

84. The method of claim 82, further comprising locating the heating system in the bathing zone.

85. The method of claim 52, further comprising attracting a minimum of 100,000 annual visitors to the urban beach recreational complex.

86. The method of claim 52, further comprising locating third party entertainment amenities within the urban beach recreational complex.

87. The method of claim 52, further comprising charging an entry fee to the urban beach recreational complex in the range of $5 to $150 per individual.

88. The method of claim 52, further comprising charging an entry fee to the urban beach recreational complex in the range of $10 to $20 per individual.

89. The method of claim 52, further comprising designing the lagoon to accommodate the use of water sports that utilize small watercraft, wherein the water sports are selected from the group comprising: sailing, boating, canoeing, rowing, kayaking, water skiing, flyboarding, paddleboarding, parasailing, wakeboarding, windsurfing, kiteboarding, and kitesurfing.

90. The method of claim 52, further comprising establishing the entry fee based on predetermined factors including age, number of people within groups, and seasonality.

91. The method of claim 52, wherein the entry fee may be paid on site or may be pre-purchased.

92. The method of claim 52, wherein the entry fee may be part of a seasonal pass.

93. The method of claim 52, further comprising locating small wave generating equipment on the perimeter of the lagoon, the small wave generating equipment arranged and configured to generate water surface textures and aesthetic waves.

94. The method of claim 93, wherein the aesthetic waves have maximum amplitude of 50 cm.

* * * * *